United States Patent
Fan et al.

(10) Patent No.: US 9,616,403 B2
(45) Date of Patent: Apr. 11, 2017

(54) SYSTEMS AND METHODS FOR CONVERTING CARBONACEOUS FUELS

(71) Applicant: OHIO STATE INNOVATION FOUNDATION, Columbus, OH (US)

(72) Inventors: Liang-Shih Fan, Columbus, OH (US); Dawei Wang, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 2 days.

(21) Appl. No.: 14/774,730

(22) PCT Filed: Mar. 14, 2014

(86) PCT No.: PCT/US2014/028217
§ 371 (c)(1),
(2) Date: Sep. 11, 2015

(87) PCT Pub. No.: WO2014/152914
PCT Pub. Date: Sep. 25, 2014

(65) Prior Publication Data
US 2016/0016137 A1    Jan. 21, 2016

Related U.S. Application Data

(60) Provisional application No. 61/782,526, filed on Mar. 14, 2013.

(51) Int. Cl.
  *B01J 8/26* (2006.01)
  *B01J 8/08* (2006.01)
  (Continued)

(52) U.S. Cl.
  CPC ............... *B01J 8/26* (2013.01); *B01J 8/003* (2013.01); *B01J 8/005* (2013.01); *B01J 8/0015* (2013.01);
  (Continued)

(58) Field of Classification Search
  CPC ..... B01J 8/26; B01J 8/28; B01J 8/0018; B01J 8/003; B01J 8/005; B01J 8/0055;
  (Continued)

(56) References Cited

U.S. PATENT DOCUMENTS

| 971,206 A | 9/1910 | Messerschmitt |
|---|---|---|
| 1,078,686 A | 11/1913 | Lane |

(Continued)

FOREIGN PATENT DOCUMENTS

| CN | 101389734 | 3/2009 |
|---|---|---|
| CN | 101426885 | 5/2009 |

(Continued)

OTHER PUBLICATIONS

Abad et al., "Chemical-looping combustion in a 300 W continuously operating reactor system using a manganese-based oxygen carrier," Fuel, 2006, vol. 85, Issue 9, pp. 1174-1185.

(Continued)

*Primary Examiner* — Lessanework Seifu
(74) *Attorney, Agent, or Firm* — Michael Best & Friedrich LLP

(57) ABSTRACT

A system for converting carbonaceous fuels is provided. The system includes a gaseous fuel conversion reactor, a solid fuel conversion reactor, and a fuel pretreatment fluidized bed reactor disposed between the gaseous fuel conversion reactor and the solid fuel conversion reactor. The fuel pretreatment fluidized bed reactor devolatilizes a solid fuel using heat to produce an off-gas and a devolatilized solid fuel. The gaseous fuel conversion reactor converts the off-gas from the fuel pretreatment fluidized bed reactor to a product gas stream comprising carbon dioxide and water. The solid fuel conversion reactor receives a mixture of oxygen carrier solids and devolatilized solid fuel from the pretreatment reactor discharge and reduces the devolatilized solid fuel (Continued)

with the oxygen carrier solids to convert the devolatilized solid fuel to an intermediate gas.

20 Claims, 19 Drawing Sheets

(51) Int. Cl.
*B01J 8/12* (2006.01)
*C10J 3/72* (2006.01)
*B01J 8/18* (2006.01)
*B01J 8/00* (2006.01)

(52) U.S. Cl.
CPC ........... *B01J 8/0025* (2013.01); *B01J 8/0055* (2013.01); *B01J 8/085* (2013.01); *B01J 8/087* (2013.01); *B01J 8/12* (2013.01); *B01J 8/125* (2013.01); *B01J 8/1827* (2013.01); *B01J 8/1836* (2013.01); *C10J 3/725* (2013.01); *B01J 2208/0038* (2013.01); *B01J 2208/00752* (2013.01); *B01J 2208/00893* (2013.01); *B01J 2208/00902* (2013.01); *B01J 2208/00911* (2013.01)

(58) Field of Classification Search
CPC ..... B01J 8/085; B01J 8/12; B01J 8/125; B01J 8/1827; B01J 8/1836; B01J 2208/752; B01J 2208/0893; B01J 2208/00752; B01J 2208/0093; C10J 3/725
See application file for complete search history.

(56) References Cited

U.S. PATENT DOCUMENTS

| | | |
|---|---|---|
| 1,658,939 A | 2/1928 | Parsons |
| 2,182,747 A | 12/1939 | Marshall, Jr. |
| 2,198,560 A | 4/1940 | Marshall, Jr. |
| 2,449,635 A | 9/1948 | Barr |
| 2,614,067 A | 10/1952 | Reed et al. |
| 2,635,947 A | 4/1953 | Reed et al. |
| 2,686,819 A | 8/1954 | Johnson |
| 2,694,622 A | 11/1954 | Reed et al. |
| 2,697,686 A | 12/1954 | Leffer |
| 2,899,374 A | 8/1959 | Gomory |
| 3,031,287 A | 4/1962 | Benson et al. |
| 3,027,238 A | 9/1962 | Watkins |
| 3,338,667 A | 8/1967 | Pundsack |
| 3,353,925 A | 11/1967 | Baumann et al. |
| 3,421,869 A | 1/1969 | Benson |
| 3,442,613 A | 5/1969 | Grotz, Jr. |
| 3,442,619 A | 5/1969 | Huebler et al. |
| 3,442,620 A | 5/1969 | Huebler et al. |
| 3,494,858 A | 2/1970 | Luckenback |
| 3,573,224 A | 3/1971 | Strelzoff et al. |
| 3,619,142 A | 11/1971 | Johnson et al. |
| 3,726,966 A | 4/1973 | Johnston |
| 4,017,270 A | 4/1977 | Funk et al. |
| 4,057,402 A | 11/1977 | Patel et al. |
| 4,108,732 A | 8/1978 | Nuttall, Jr. |
| 4,272,399 A | 6/1981 | Davis et al. |
| 4,325,833 A | 4/1982 | Scott |
| 4,334,959 A | 6/1982 | Green |
| 4,343,624 A | 8/1982 | Belke et al. |
| 4,348,487 A | 9/1982 | Goldstein et al. |
| 4,404,086 A | 9/1983 | Oltrogge |
| 4,420,332 A | 12/1983 | Mori et al. |
| 4,521,117 A | 6/1985 | Ouwerkerk et al. |
| 4,778,585 A | 10/1988 | Graff |
| 4,842,777 A | 6/1989 | Lamort |
| 4,861,165 A | 8/1989 | Fredriksson et al. |
| 4,869,207 A | 9/1989 | Engstrom et al. |
| 4,895,821 A | 1/1990 | Kainer et al. |
| 4,902,586 A | 2/1990 | Wertheim |
| 5,130,106 A | 7/1992 | Koves et al. |
| 5,365,560 A | 11/1994 | Tam |
| 5,447,024 A | 9/1995 | Ishida et al. |
| 5,509,362 A | 4/1996 | Lyon |
| 5,518,187 A | 5/1996 | Bruno et al. |
| 5,529,599 A | 6/1996 | Calderon |
| 5,630,368 A | 5/1997 | Wagoner |
| 5,730,763 A | 3/1998 | Manulescu et al. |
| 5,770,310 A | 6/1998 | Noguchi et al. |
| 5,827,496 A | 10/1998 | Lyon |
| 5,858,210 A | 1/1999 | Richardson |
| 6,007,699 A | 12/1999 | Cole |
| 6,143,253 A | 11/2000 | Radcliffe et al. |
| 6,180,354 B1 | 1/2001 | Singh et al. |
| 6,361,757 B1 | 3/2002 | Shikada et al. |
| 6,395,944 B1 | 5/2002 | Griffiths |
| 6,412,559 B1 | 7/2002 | Gunter et al. |
| 6,494,153 B1 | 12/2002 | Lyon |
| 6,509,000 B1 | 1/2003 | Choudhary et al. |
| 6,517,631 B1 | 2/2003 | Bland |
| 6,631,698 B1 | 10/2003 | Hyppanen et al. |
| 6,642,174 B2 | 11/2003 | Gaffney et al. |
| 6,663,681 B2 | 12/2003 | Kindig et al. |
| 6,667,022 B2 | 12/2003 | Cole |
| 6,669,917 B2 | 12/2003 | Lyon |
| 6,682,714 B2 | 1/2004 | Kindig et al. |
| 6,685,754 B2 | 2/2004 | Kindig et al. |
| 6,703,343 B2 | 3/2004 | Park |
| 6,797,253 B2 | 9/2004 | Lyon |
| 6,834,623 B2 | 12/2004 | Cheng |
| 6,875,411 B2 | 4/2005 | Sanfilippo et al. |
| 6,880,635 B2 | 4/2005 | Vinegar et al. |
| 7,001,579 B2 | 2/2006 | Metzger et al. |
| 7,244,399 B2 | 7/2007 | Myöhänen et al. |
| 7,404,942 B2 | 7/2008 | Sanfilippo et al. |
| 7,496,450 B2 | 2/2009 | Ortiz Alemán et al. |
| 7,767,191 B2 | 8/2010 | Thomas et al. |
| 7,837,975 B2 | 11/2010 | Iyer et al. |
| 7,840,053 B2 | 11/2010 | Liao |
| 8,116,430 B1 | 2/2012 | Shapiro et al. |
| 8,192,706 B2 | 6/2012 | Grochowski |
| 8,202,349 B2 | 6/2012 | Molaison |
| 8,419,813 B2 | 4/2013 | Hoteit et al. |
| 8,435,920 B2 | 5/2013 | White et al. |
| 8,508,238 B2 | 8/2013 | Mahalingam et al. |
| 8,761,943 B2 | 6/2014 | Lou et al. |
| 8,771,549 B2 | 7/2014 | Gauthier et al. |
| 8,814,963 B2 | 8/2014 | Apanel et al. |
| 8,877,147 B2 | 11/2014 | Fan et al. |
| 9,376,318 B2 | 6/2016 | Fan et al. |
| 2001/0055559 A1 | 12/2001 | Sanfilippo et al. |
| 2003/0024388 A1 | 2/2003 | Scharpf |
| 2003/0031291 A1 | 2/2003 | Yamamoto et al. |
| 2003/0119658 A1 | 6/2003 | Allison et al. |
| 2003/0130360 A1 | 7/2003 | Kindig et al. |
| 2003/0180215 A1 | 9/2003 | Niu et al. |
| 2003/0188668 A1 | 10/2003 | Bland |
| 2004/0028181 A1 | 2/2004 | Charles Jr. et al. |
| 2004/0030214 A1 | 2/2004 | Schindler et al. |
| 2004/0109800 A1 | 6/2004 | Pahlman et al. |
| 2004/0126293 A1 | 7/2004 | Geerlings et al. |
| 2004/0131531 A1 | 7/2004 | Geerlings et al. |
| 2004/0132833 A1 | 7/2004 | Espinoza et al. |
| 2004/0138060 A1 | 7/2004 | Rapier et al. |
| 2004/0197612 A1 | 10/2004 | Keefer et al. |
| 2004/0213705 A1 | 10/2004 | Blencoe et al. |
| 2004/0233191 A1 | 11/2004 | Mukherjee et al. |
| 2004/0244289 A1 | 12/2004 | Morozumi et al. |
| 2004/0265224 A1 | 12/2004 | Papavassiliou et al. |
| 2005/0002847 A1 | 1/2005 | Maroto-Valer et al. |
| 2005/0054880 A1 | 3/2005 | Dubois et al. |
| 2005/0175533 A1 | 8/2005 | Thomas et al. |
| 2005/0255037 A1 | 11/2005 | Otsuka et al. |
| 2005/0265912 A1 | 12/2005 | Alvarez Jr et al. |
| 2005/0274648 A1 | 12/2005 | Goldstein et al. |
| 2006/0042565 A1 | 3/2006 | Hu |
| 2006/0094593 A1 | 5/2006 | Beech et al. |
| 2007/0010588 A1 | 1/2007 | Pearson |
| 2007/0049489 A1 | 3/2007 | Becue et al. |
| 2007/0157517 A1 | 7/2007 | Tsay et al. |

(56) References Cited

U.S. PATENT DOCUMENTS

| | | |
|---|---|---|
| 2007/0258878 A1 | 11/2007 | Sanfilippo et al. |
| 2008/0031809 A1 | 2/2008 | Norbeck et al. |
| 2008/0161624 A1 | 7/2008 | Glover et al. |
| 2008/0209807 A1 | 9/2008 | Tsangaris et al. |
| 2008/0314838 A1 | 12/2008 | Becker et al. |
| 2009/0000194 A1 | 1/2009 | Fan et al. |
| 2009/0042070 A1 | 2/2009 | Brown, Jr. et al. |
| 2009/0160461 A1 | 6/2009 | Zangl et al. |
| 2010/0071262 A1 | 3/2010 | Robinson et al. |
| 2010/0184589 A1 | 7/2010 | Miyairi et al. |
| 2010/0187159 A1 | 7/2010 | Naunheimer |
| 2010/0258429 A1 | 10/2010 | Ugolin |
| 2010/0293845 A1 | 11/2010 | Zeman et al. |
| 2010/0332170 A1 | 12/2010 | Gao et al. |
| 2011/0005395 A1 | 1/2011 | Vimalchand et al. |
| 2011/0011720 A1 | 1/2011 | Rinker |
| 2011/0054049 A1 | 3/2011 | Lambert et al. |
| 2011/0094226 A1 | 4/2011 | Mchugh et al. |
| 2011/0146152 A1 | 6/2011 | Vimalchand et al. |
| 2011/0176968 A1* | 7/2011 | Fan ............ C10J 3/12 422/139 |
| 2011/0289845 A1 | 12/2011 | Davis et al. |
| 2011/0291051 A1 | 12/2011 | Hershkowitz et al. |
| 2011/0300060 A1 | 12/2011 | Guillou et al. |
| 2011/0303875 A1 | 12/2011 | Hoteit et al. |
| 2012/0159841 A1 | 6/2012 | Fan et al. |
| 2012/0167585 A1 | 7/2012 | Wormser |
| 2012/0171588 A1 | 7/2012 | Fan et al. |
| 2012/0214106 A1 | 8/2012 | Sit et al. |
| 2013/0085365 A1 | 4/2013 | Marashdeh et al. |
| 2013/0149650 A1* | 6/2013 | Gauthier .......... C10J 3/725 431/7 |
| 2013/0255272 A1 | 10/2013 | Ajhar et al. |
| 2014/0034134 A1 | 2/2014 | Fan et al. |
| 2014/0072917 A1 | 3/2014 | Fan et al. |
| 2014/0144082 A1 | 5/2014 | Fan et al. |
| 2014/0295361 A1 | 10/2014 | Fan et al. |
| 2015/0238915 A1 | 8/2015 | Fan et al. |

FOREIGN PATENT DOCUMENTS

| | | |
|---|---|---|
| CN | 102612625 | 7/2012 |
| EP | 1134187 | 9/2001 |
| EP | 1445018 | 8/2004 |
| EP | 1580162 | 9/2005 |
| EP | 1845579 | 10/2007 |
| EP | 1933087 | 6/2008 |
| EP | 2450420 | 5/2012 |
| EP | 2515038 | 10/2012 |
| EP | 2601443 | 6/2013 |
| FR | 2924035 | 5/2009 |
| JP | H10249153 | 9/1998 |
| TW | 406055 | 9/2000 |
| TW | 426728 | 3/2001 |
| WO | 90/13773 | 11/1990 |
| WO | 99/65097 | 12/1999 |
| WO | 00/22690 | 4/2000 |
| WO | 00/68339 | 11/2000 |
| WO | 01/042132 | 6/2001 |
| WO | 03/070629 | 8/2003 |
| WO | 2007/082089 | 7/2007 |
| WO | 2007/122498 | 11/2007 |
| WO | 2007/134075 | 11/2007 |
| WO | 2008/019079 | 2/2008 |
| WO | 2008/071215 | 6/2008 |
| WO | 2008/082312 | 7/2008 |
| WO | 2008/115076 | 9/2008 |
| WO | 2009/009388 | 1/2009 |
| WO | 2009/021258 | 2/2009 |
| WO | 2009/114309 | 9/2009 |
| WO | 2009/007200 | 11/2009 |
| WO | 2010/037011 | 4/2010 |
| WO | 2010/063923 | 6/2010 |
| WO | 2010/126617 | 11/2010 |
| WO | 2011/021161 | 2/2011 |
| WO | 2011/031752 | 3/2011 |
| WO | 2011/031755 | 3/2011 |
| WO | 2011/084734 | 7/2011 |
| WO | 2011/153568 | 12/2011 |
| WO | 2012/064712 | 5/2012 |
| WO | 2012/077978 | 6/2012 |
| WO | 2012/155054 | 11/2012 |
| WO | 2012/155059 | 11/2012 |
| WO | 2013/040645 | 3/2013 |
| WO | 2014/085243 | 6/2014 |

OTHER PUBLICATIONS

Abad et al., "Reduction Kinetics of Cu–, Ni–, and Fe– Based Oxygen Carriers Using Syngas (CO + H2) for Chemical-Looping Combustion," Energy Fuels, 2007, 21 (4), pp. 1843-1853.

Abad et al., "The use of iron oxide as oxygen carrier in a chemical-looping reactor," Fuel, 2007, vol. 86, Issues 7-8, pp. 1021-1035.

Adanez et al., "Progress in Chemical-Looping Combustion and Reforming technologies," Progress in Energy and Combustion Science, 2012, vol. 38, Issue 2, pp. 215-282.

Azis et al., "On the evaluation of synthetic and natural ilmenite using syngas as fuel in chemical-looping combustion (CLC)," Chemical Engineering Research and Design, 2010, vol. 88, Issue 11, pp. 1505-1514.

Balasubramanian et al., "Hydrogen from methane in a single-step process," Chem Engr Science, 1999, 54(15-16), 3543.

Cao et al., "Investigation of Chemical Looping Combustion by Solid Fuels. 1. Process Analysis," Energy Fuels, 2006, 20(5), pp. 1836-1844.

Cho et al., "Comparison of iron–, nickel–, copper– and manganese-based oxygen carriers for chemical-looping combustion," Fuel, 2004, vol. 83, Issue 9, pp. 1215-1225.

De Diego et al., "Development of Cu-based oxygen carriers for chemical-looping combustion," Fuel, 2004, vol. 83, Issue 13, pp. 1749-1757.

Denton et al., "Simultaneous Production of High-Purity Hydrogen and Sequestration-Ready CO2 from Syngas," 2003.

Environmental Protection Agency, "Geological CO2 Sequestration Technology and Cost Analysis," Technical Support Document, pp. i-vi & pp. 1-61, Jun. 2008.

Fan et al., "Chemical looping processes for CO2 capture and carbonaceous fuel conversion prospect and opportunity," Energy Environmental Science, 2012, p. 7254-7280.

Fan et al., "Utilization of chemical looping strategy in coal gasification processes," Particuology, 2008, vol. 6, Issue 3, pp. 131-142.

Forero et al., "Syngas combustion in a 500 Wth Chemical-Looping Combustion system using an impregnated Cu-based oxygen carrier," Fuel Processing Technology, 2009, vol. 90, Issue 12, pp. 1471-1479.

Gao et al., "Production of syngas via autothermal reforming of methane in a fluidized-bed reactor over the combined $CeO_2–ZrO_2/SiO_2$ supported Ni catalysts," International Journal of Hydrogen Energy, 2008, vol. 33, p. 5493-5500.

Garcia-Labiano et al., "Temperature variations in the oxygen carrier particles during their reduction and oxidation in a chemical-looping combustion system," Chemical Engineering Science, 2005, vol. 60, No. 3, pp. 851-862.

Geldart, "Types of Gas Fluidization," Power Technology, vol. 7, pp. 285-292, 1973.

Ghanapragasam et al., "Hydrogen production from coal direct chemical looping and syngas chemical looping combustion systems: Assessment of system operation and resource requirements," International Journal of Hydrogen Energy, 2009, vol. 34, Issue 6, pp. 2606-2615.

Go et al., "Hydrogen production from two-step steam methane reforming in a fluidized bed reactor," International Journal of Hydrogen Energy, 2009, vol. 34, p. 1301-1309.

Haque, "Microwave energy for mineral treatment processes - a brief review," International Journal of Mineral Processing, vol. 57, pp. 1-24, 1999.

(56) References Cited

OTHER PUBLICATIONS

Herzog, "Carbon Sequestration via Mineral Carbonation: Overview and Assessment," MIT Laboratory for Energy and the Environmental, http://sequestration.mit.edu/pfd/carbonates.pdf, Mar. 14, 2002.
Hildebrandt et al., "Producing Transportation Fuels with Less Work," Science, Mar. 27, 2009, vol. 323, pp. 1680-1681.
Hossain et al., "Chemical-looping combustion (CLC) for inherent CO2 separations - a review," Chemical Engineering Science, 2008, vol. 63, Issue 18, pp. 4433-4451.
Hua et al., "Three Dimensional Analysis of Electrical Capacitance Tomography Sensing Fields," 1999 IOP Publishing LTD, vol. 10, pp. 717-725.
Huijgen et al., "Carbon dioxide sequestration by mineral carbonation," ECN-C--03-016, www.ecn.nl/docs/library/report/200e/c03016.pdf, Feb. 2003.
Jadhav et al., "Carbonation of Mg-Bearing Minerals: Kinetic and Mechanistic Studies," Ohio Coal Research Consortium/Ohio State University Project C3.12, www.ohiocoal.org/projects/year3/c3.12, Jul. 3, 2002.
Jin et al., "Development of a Novel Chemical-Looping Combustion: Synthesis of a Looping Material with a Double Metal Oxide of Co0–NiO," Energy & Fuels, 1998, vol. 12, 1272-1277.
Johansson et al., "Combustion of Syngas and Natural Gas in a 300 W Chemical-Looping Combustor," Chemical Engineering Research and Design Volume, 2006, vol. 84, Issue 9, pp. 819-827.
Kaiser et al., "Precombustion and Postcombustion Decarbonization," IEEE, Power Engineering Review, Apr. 2001, pp. 15-17.
Leion et al., "Solid fuels in chemical-looping combustion using oxide scale and unprocessed iron ore as oxygen carriers," Fuel, 2009, vol. 88, Issue 10, pp. 1945-1954.
Leion et al., "Solid fuels in chemical-looping combustion," International Journal of Greenhouse Gas Control, 2008, vol. 2, Issue 2, pp. 180-193.
Leion et al., "The use of petroleum coke as fuel in chemical-looping combustion," Fuel, 2007, vol. 86, Issue 12-13, pp. 1947-1958.
Li et al., "Clean coal conversion processes—progress and challenges," the Royal Society of Chemistry, Energy & Environmental Science, Jul. 30, 2008, vol. 1, pp. 248-267.
Li et al., "Role of Metal Oxide Support in Redox Reactions of Iron Oxide for Chemical Looping Applications: Experiments and Density Functional Theory Calculations," Energy Environmental Science, 2011, vol. 4, p. 3661-3667.
Li et al., "Syngas chemical looping gasification process: Bench-scale studies and reactor simulations," AICHE Journal, 2010, vol. 56, Issue 8, pp. 2186-2199.
Li et al., "Syngas Chemical Looping Gasification Process: Oxygen Carrier Particle Selection and Performance," Energy Fuels, 2009, 23(8), pp. 4182-4189.
Lyngfelt, "Chemical Looping Combustion of Solid Fuels—Status of Development," Applied Energy, 2014, vol. 113, p. 1869-1873.
Lyngfelt, "Oxygen Carriers for Chemical Looping Combustion Operational Experience," 1st International Conference on Chemical Looping, Mar. 2010.
Mamman et al., "Simultaneous steam and CO2 reforming of methane to syngas over NiO/MgO/SA-5205 in presence and absence of oxygen," Applied Catalysis A, 1998, vol. 168, p. 33-46.
Marashdeh, Q. et al., "A Multimodal Tomography System Based on ECT Sensors," IEEE Sensors Journal, vol. 7, No. 3, 2007, 426-433.
Marashdeh, Q., Advances in Electrical Capacitance Tomography, Dissertation, The Ohio State University, 2006.
Mattisson et al., "Application of chemical-looping combustion with capture of CO2," Second Nordic Minisymposium on Carbon Dioxide Capture and Storage, Goeteborg, Oct. 26, 2001, pp. 46-51.
Mattisson et al., "Chemical-looping combustion using syngas as fuel," International Journal of Greenhouse Gas control, 2007, vol. 1, Issue 2, pp. 158-169.
Mattisson et al., "Co 2 capture from coal combustion using chemical-looping combustion—Reactivity investigation of Fe, Ni and Mn based oxygen carriers using syngas," Department of Energy and Environment, Division of Energy Technology and Department of Chemical and Biological Engineering, Division of Environmental Inorganic Chemistry, Chalmers University of Technology, 2007.
Mattisson et al., "Reactivity of Some Metal Oxides Supported on Alumina with Alternating Methane and Oxygen—Application for Chemical-Looping Combustion," Energy & Fuels, 2003, vol. 17, pp. 643-651.
Mattisson et al., "The use of iron oxide as an oxygen carrier in chemical-looping combustion of methane with inherent separation of CO2," Fuel, 2001, vol. 80, pp. 1953-1962.
Mattisson et al., "Use of Ores and Industrial Products As Oxygen Carriers in Chemical-Looping Combustion," Energy & Fuels, 2009, vol. 23, pp. 2307-2315.
Ockwig et al., "Membranes for Hydrogen Separation," American Chemical Society, Chem. Rev., Oct. 10, 2007, vol. 107, pp. 4078-4110.
O'Connor et al., "Carbon Dioxide Sequestration by Direct Mineral Carbonation: Results from Recent Studies and Currents Status," Abstract, USDOE Office of Fossil Energy, 2001.
Ohio Coal Development Office of the Ohio Air Quality Development Authority, "Ohio Coal Research Consortium (OCRC) - IV, Year 3 Proposal Solicitation," http://www.ohioquality.org/ocdo/other_pdf/Consortium_IV_Year_3_RFP.podf (2006).
Ortiz et al., "Hydrogen Production by Auto-Thermal Chemical-Looping Reforming in a Pressurized Fluidized Bed Reactor Using Ni-based Oxygen Carriers," International Journal of Hydrogen Energy, 2010, vol. 35, p. 151-160.
Park et al., "CO2 Mineral Sequestration: Chemically Enhanced Aqueous Carbonation of Serpentine," The Canadian Journal of Chemical Engineering, 2003, vol. 81, pp. 885-890.
Park et al., "CO2 Mineral Sequestration: physically activated dissolution of serpentine and pH swing process," Chemical Engineering Science, 2004, vol. 59, pp. 5241-5247.
Pröll et al., "Syngas and a separate nitrogen/argon stream via chemical looping reforming—A 140 kW pilot plant study," Fuel, 2010, vol. 89, Issue 6, pp. 1249-1256.
Ruchenstein et al., "Carbon dioxide reforming of methane over nickel/alkaline earth metal oxide catalysts," Applied Catalysis A, 1995, vol. 133, p. 149-161.
Russo et al., "Impact of Process Design of on the Multiplicity Behavior of a Jacketed Exothermic CSTR," AICHE Journal, Jan. 1995, vol. 41, No. 1, pp. 135-147.
Ryden et al., "Synthesis gas generation by chemical-looping reforming in a continuously operating laboratory reactor," Fuel, 2006, vol. 85, p. 1631-1641.
Scott et al., "In situ gasification of a solid fuel and CO2 separation using chemical looping," AICHE Journal, 2006, vol. 52, Issue 9, pp. 3325-3328.
Shen et al., "Chemical-Looping Combustion of Biomass in a 10kWth Reactor with Iron Oxide as an Oxygen Carrier," Energy & Fuels, 2009, vol. 23, pp. 2498-2505.
Shen et al., "Experiments on chemical looping combustion of coal with a NiO based oxygen carrier," Combustion and Flame, 2009, vol. 156, Issue 3, pp. 721-728.
Sridhar et al., "Syngas Chemical Looping Process: Design and Construction of a 25 kWth Subpilot Unit," Energy Fuels, 2012, 26(4), pp. 2292-2302.
Steinfeld et al., "Design Aspects of Solar Thermochemical Engineering—A case Study: Two-Step Water-Splitting Cycle Using the Fe3O4/FeO Redox System," Solar Energy, 1999, pp. 43-53.
Steinfeld, "Solar hydrogen production via a two-step water-splitting thermochemical cycle based on Zn/ZnO redox reactions," International Journal of Hydrogen Energy, 2002, vol. 27, pp. 611-619.
Tian et al., "Thermodynamic investigation into carbon deposition and sulfur evolution in a Ca-based chemical-looping combustion system," Chemical Engineering Research & Design, 2011, vol. 89, Issue 9, p. 1524.
U.S. Department of Energy, NCCTI Energy Technologies Group, Office of Fossil Energy, "CO2 Capture and Storage in Geologic Formations," pp. 34, Revised Jan. 8, 2002.
Usachev et al., "Conversion of Hydrocarbons to Synthesis Gas: Problems and Prospects," Petroleum Chemistry, 2011, vol. 51, p. 96-106.

(56) References Cited

OTHER PUBLICATIONS

Vernon et al., "Partial Oxidation of Methane to Synthesis Gas," Catalysis Letters, 1990, vol. 6, p. 181-186.
Warsito, W. et al., Electrical Capacitance Volume Tomography, 2007, pp. 1-9.
Yamazaki et al., "Development of highly stable nickel catalyst for methane-steam reaction under low steam to carbon ratio," Applied Catalyst A, 1996, vol. 136, p. 49-56.
Zafar et al., "Integrated Hydrogen and Power Production with CO2 Capture Using Chemical-Looping ReformingRedox Reactivity of Particles of CuO, Mn2O3, NiO, and Fe2O3 Using SiO2 as a Support," Ind. Eng. Chem. Res., 2005, 44(10), pp. 3485-3496.
International Preliminary Report on Patentability for International Application PCT/US/2007/000956 dated Jul. 24, 2008.
International Preliminary Report on Patentability for International Application PCT/US/2010/048121 dated Mar. 22, 2012.
International Preliminary Report on Patentability for International Application PCT/US/2010/048125 dated Mar. 22, 2012.
International Preliminary Report on Patentability for International Application PCT/US/2011/059736 dated May 23, 2013.
International Preliminary Report on Patentability for International Application PCT/US/2012/037544 dated Nov. 12, 2013.
International Preliminary Report on Patentability for International Application PCT/US/2012/037557 dated Nov. 21, 2013.
International Search Report and Written Opinion for Application No. PCT/US14/14877 dated May 14, 2014 (10 pages).
International Search Report and Written Opinion for Application No. PCT/US14/25520 dated Jul. 11, 2014 (13 pages).
International Search Report and Written Opinion for Application No. PCT/US14/26071 dated Jul. 10, 2014 (9 pages).
International Search Report and Written Opinion for Application No. PCT/US2007/000956 dated Dec. 4, 2007.
International Search Report and Written Opinion for Application No. PCT/US2009/058579 dated Aug. 3, 2010.
International Search Report and Written Opinion for Application No. PCT/US2010/048121 dated Apr. 1, 2011.
International Search Report and Written Opinion for Application No. PCT/US2010/048125 dated Dec. 17, 2010.
International Search Report and Written Opinion for Application No. PCT/US2011/059736 dated Mar. 27, 2012.
International Search Report and Written Opinion for Application No. PCT/US2012/037544 dated Aug. 10, 2012.
International Search Report and Written Opinion for Application No. PCT/US2012/037557 dated Aug. 13, 2012.
International Search Report and Written Opinion for Application No. PCT/US2014/027839 dated Jul. 24, 2014 (9 pages).
International Search Report and Written Opinion for Application No. PCT/US2014/028217 dated Jul. 28, 2014 (8 pages).
International Search Report and Written Opinion for Application No. PCT/US2015/018123 dated May 8, 2015 (10 pages).
Advisory Action pertaining to U.S. Appl. No. 12/160,803 dated Jul. 11, 2013.
Advisory Action pertaining to U.S. Appl. No. 13/121,009 dated Jun. 24, 2013.
Examiner's Answer before the Patent Trial and Appeal Board for U.S. Appl. No. 12/160,803 dated Nov. 4, 2013.
Final Rejection pertaining to U.S. Appl. No. 12/160,803 dated Jan. 5, 2012.
Final Rejection pertaining to U.S. Appl. No. 12/160,803 dated Mar. 22, 2013.
Final Rejection pertaining to U.S. Appl. No. 13/121,009 dated Jan. 16, 2014.
Final Rejection pertaining to U.S. Appl. No. 13/121,009 dated Mar. 14, 2013.
Office Action pertaining to U.S. Appl. No. 12/160,803 dated Jun. 5, 2012.
Office Action pertaining to U.S. Appl. No. 12/160,803 dated Jun. 7, 2011.
United States Patent Office Action for U.S. Appl. No. 12/160,803 dated Feb. 23, 2016 (27 pages).
Office Action pertaining to U.S. Appl. No. 13/121,009 dated Sep. 13, 2013.
Office Action pertaining to U.S. Appl. No. 13/121,009 dated Sep. 6, 2012.
United States Patent Office Action for U.S. Appl. No. 13/394,396 dated Dec. 18, 2014 (14 pages).
United States Patent Office Final Rejection for U.S. Appl. No. 13/394,396 dated Jul. 2, 2015 (15 pages).
United States Patent Office Action for U.S. Appl. No. 13/394,396 dated Jan. 15, 2016 (13 pages).
United States Patent Office Action for U.S. Appl. No. 13/394,572 dated Apr. 9, 2014 (26 pages).
United States Patent Office Action for U.S. Appl. No. 13/394,572 dated Aug. 26, 2014 (16 pages).
United States Patent Office Action for U.S. Appl. No. 13/394,572 dated Dec. 30, 2014 (19 pages).
United States Patent Office Action for U.S. Appl. No. 13/394,572 dated Oct. 13, 2015 (21 pages).
United States Patent Office Notice of Allowance for U.S. Appl. No. 13/394,572 dated Dec. 14, 2015 (10 pages).
United States Patent Office Notice of Allowance for U.S. Appl. No. 13/394,572 dated Feb. 22, 2016 (8 pages).
United States Patent Office Action for U.S. Appl. No. 14/091,654 dated Jun. 12, 2015 (16 pages).
United States Patent Office Action for U.S. Appl. No. 14/091,654 dated Oct. 30, 2014 (14 pages).
United States Patent Office Action for U.S. Appl. No. 14/091,654 dated Jan. 4, 2016 (17 pages).
United States Patent Office Notice of Allowance for U.S. Appl. No. 14/504,295 dated Sep. 28, 2015 (10 pages).
United States Patent Office Action for U.S. Appl. No. 15/162,199 dated Jun. 30, 2016 (10 pages).
United States Patent Office Action for U.S. Appl. No. 13/883,795 dated Jun. 20, 2016 (15 pages).
United States Patent Office Notice of Alowance for U.S. Appl. No. 13/394,396 dated Aug. 3, 2016 (8 pages).

\* cited by examiner

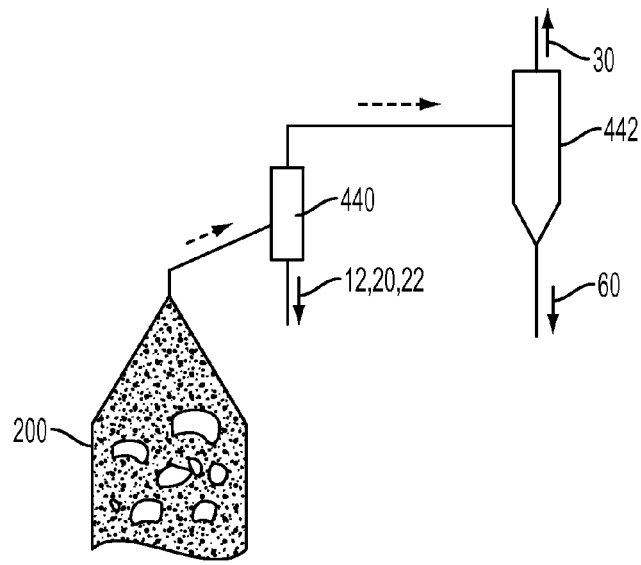
FIG. 17A
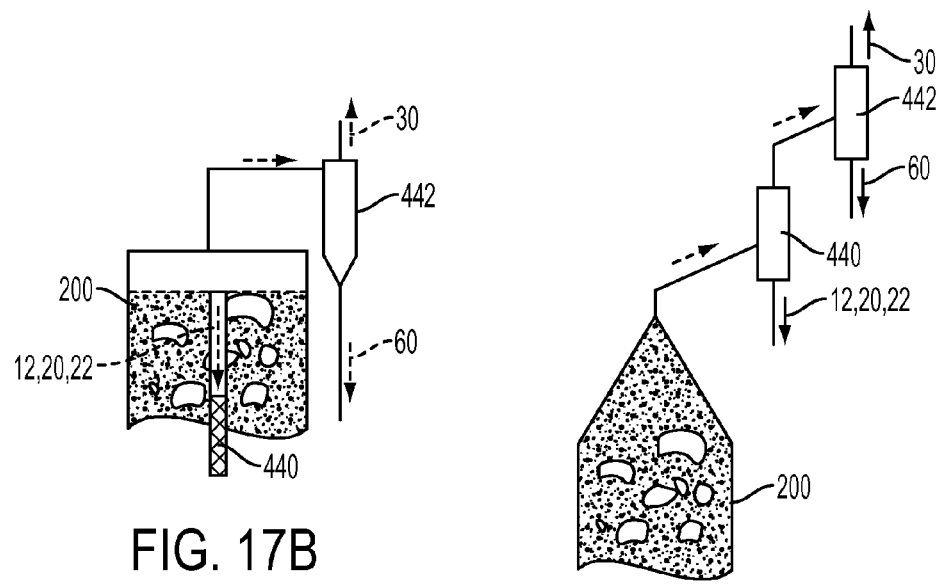
FIG. 17B
FIG. 17C

SYSTEMS AND METHODS FOR CONVERTING CARBONACEOUS FUELS

CROSS REFERENCE TO RELATED APPLICATIONS

This application is a national stage filing under 35 U.S.C. §371 of International Application No. PCT/US2014/028217, filed Mar. 14, 2014, which claims priority to U.S. Provisional Application No. 61/782,526, filed Mar. 14, 2013, the entire contents of both applications are incorporated herein by reference.

BACKGROUND

Field

The present disclosure relates to chemical reactor systems, and specifically to systems and methods for converting carbonaceous fuels in a chemical reactor system.

Technical Background

There is a constant need for clean and efficient energy generation systems. Most of the commercial processes that generate energy carriers such as steam, hydrogen, synthesis gas (syngas), liquid fuels and/or electricity are based on fossil fuels. Furthermore, the dependence on fossil fuels is expected to continue in the foreseeable future due to the lower costs when compared to renewable sources. Currently, the conversion of carbonaceous fuels such as coal, natural gas, and petroleum coke is usually conducted through a combustion or reforming process. However, combustion of carbonaceous fuels, especially coal, is a carbon intensive process that emits large quantities of carbon dioxide to the environment. Sulfur and nitrogen compounds are also generated in this process due to the complex content in coal.

Accordingly, there exists a continual need for improved fuel conversion systems which minimizes the production of undesirable pollutants and byproducts.

SUMMARY

Embodiments of the present invention are related to systems and methods for the integrated distribution of a fuel material in a process utilizing circulation of an oxygen carrier solid. The fuel material can be in the form of gas, solid, liquid, or any combination thereof. The present disclosure is directly applicable to chemical looping systems for solid fuel conversion and for clarity reference to solid fuel will used throughout this disclosure.

Chemical looping technology is an approach for clean and efficient solid fuel conversion with reduced capital and operating costs. Chemical looping processes combust or gasify carbon-based fuels indirectly with oxygen carried by an oxygen carrier solid, for example metal oxides, in a reactor. The reduced oxygen carrier solid is then re-oxidized in one or more separate reactors with oxidizing gases such as air or steam. The chemical looping technology avoids the direct contact of air with the solid fuel, eliminating the need for energy intensive gas-gas $CO_2$ separation techniques such as monoethanolamine scrubbing. Through the utilization of chemical looping strategy, the irreversibility of the fuel conversion process can be minimized, thereby resulting in significantly improved energy and energy conversion efficiencies.

In accordance with at least one embodiment, a system for converting carbonaceous fuels is provided. The system includes a gaseous fuel conversion reactor, a solid fuel conversion reactor, and a fuel pretreatment fluidized bed reactor disposed between the gaseous fuel conversion reactor and the solid fuel conversion reactor. The gaseous fuel conversion reactor has a gaseous fuel reactor oxygen carrier solid inlet, a gaseous fuel reactor off-gas inlet configured to receive off-gas from the fuel pretreatment fluidized bed reactor, and a gaseous fuel reactor oxygen carrier solid outlet. The gaseous fuel conversion reactor is configured to convert the off-gas and oxygen carrier solids to a product gas stream including carbon dioxide and water, thereby reducing at least a portion of the oxygen carrier solids to reduced oxygen carrier solids. The fuel pretreatment fluidized bed reactor comprises a pretreatment reactor solid fuel inlet disposed in a fuel introduction section of the fuel pretreatment reactor, a pretreatment reactor oxygen carrier inlet configured to receive a mixture of oxygen carrier solids and reduced oxygen carrier solids from the gaseous fuel reactor oxygen carrier solid outlet, a pretreatment reactor intermediate gas inlet configured to receive intermediate gas from the solid fuel conversion reactor, wherein the intermediate gas is used for fluidization. The fuel pretreatment fluidized bed reactor also comprises a pretreatment reactor discharge in communication with the gaseous fuel conversion reactor off-gas inlet. The fuel pretreatment fluidized bed reactor is configured to volatilize solid fuel using heat from the mixture of oxygen carrier solids and reduced oxygen carrier solids to produce a devolatilized solid fuel and off-gas and subsequently discharge the off-gas, the devolatilized solid fuel, and the mixture of oxygen carrier solids and reduced oxygen carrier solids via the pretreatment reactor discharge. The solid fuel conversion reactor comprises a solid fuel conversion reactor inlet configured to receive the mixture of oxygen carrier solids and reduced oxygen carrier solids and devolatilized solid fuel from the pretreatment reactor discharge. The solid fuel conversion reactor also comprises a solid fuel conversion reactor intermediate gas outlet in communication with the pretreatment reactor intermediate gas inlet, and a solid fuel conversion reactor oxygen carrier solid outlet. The solid fuel conversion reactor is configured to react the devolatilized solid fuel with the mixture of oxygen carrier solids and reduced oxygen carrier solids to produce the intermediate gas comprising carbon dioxide and water, thereby further reducing oxygen carrier solids to reduced oxygen carrier solids.

In accordance with another embodiment, a system for converting carbonaceous fuels is provided. The system includes a gaseous fuel conversion reactor, a solid fuel conversion reactor, a fuel pretreatment fluidized bed reactor disposed between the gaseous fuel conversion reactor and the solid fuel conversion reactor, an oxidation reactor disposed downstream of the solid fuel conversion reactor, and a pretreatment gas-solids separation unit. The gaseous fuel conversion reactor having a gaseous fuel reactor oxygen carrier solid inlet, a gaseous fuel reactor off-gas inlet configured to receive off-gas from the fuel pretreatment fluidized bed reactor, and a gaseous fuel reactor oxygen carrier solid outlet. The gaseous fuel conversion reactor is configured to convert the off-gas and oxygen carrier solids to a product gas stream comprising carbon dioxide and water, thereby reducing at least a portion of the oxygen carrier solids to reduced oxygen carrier solids. The fuel pretreatment fluidized bed reactor having a pretreatment reactor solid fuel inlet disposed in a fuel introduction section of the fuel pretreatment reactor, a pretreatment reactor oxygen carrier inlet configured to receive a mixture of oxygen carrier solids and reduced oxygen carrier solids from the gaseous fuel reactor oxygen carrier solid outlet, a pretreatment reactor intermediate gas inlet configured to receive intermediate gas from the solid fuel conversion reactor, the intermediate gas being used for fluidization, and a pretreatment reactor discharge in communication with the gaseous fuel conversion reactor off-gas inlet. The fuel pretreatment fluidized bed reactor is configured to volatilize solid fuel using heat from the mixture of oxygen carrier solids and reduced oxygen carrier solids to produce a devolatilized solid fuel and off-gas, and subsequently discharge the off-gas, the devolatilized solid fuel, and the mixture of oxygen carrier solids and reduced oxygen carrier solids via the pretreatment reactor discharge. The solid fuel conversion reactor having a solid fuel conversion reactor inlet configured to receive the mixture of oxygen carrier solids and reduced oxygen carrier solids and devolatilized solid fuel from the pretreatment reactor discharge, a solid fuel conversion reactor intermediate gas outlet in communication with the pretreatment reactor intermediate gas inlet, and a solid fuel conversion reactor oxygen carrier solid outlet. The solid fuel conversion reactor being configured to react the devolatilized solid fuel with the mixture of oxygen carrier solids and reduced oxygen carrier solids to produce the intermediate gas comprising carbon dioxide and water, thereby further reducing oxygen carrier solids to reduced oxygen carrier solids. The oxidation reactor having a reduced oxygen carrier solid inlet configured to receive the reduced oxygen carrier solid and an oxidation reactor discharge configured to discharge the oxygen carrier solid and an oxygen depleted oxidation gas stream. The oxidation reactor being configured to react the reduced oxygen carrier solids from the solid fuel conversion reactor oxygen carrier solid outlet with an oxidation gas stream to convert the reduced oxygen carrier solid back to the oxygen carrier solid. Additionally, the pretreatment gas-solids separation unit is in communication with the pretreatment reactor discharge and configured to separate the off-gas from the devolatilized solid fuel and the oxygen carrier solid exiting the fuel pretreatment reactor.

Additional features and advantages of the systems and methods for converting carbonaceous fuels will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The following detailed description of specific embodiments of the present disclosure can be best understood when read in conjunction with the following drawings, where like structure is indicated with like reference numerals and in which:

FIG. 17A is a schematic illustration of a section of a system for converting carbonaceous fuels, according to one or more embodiments described herein;

FIG. 17B is a schematic illustration of a section of a system for converting carbonaceous fuels, according to one or more embodiments described herein;

FIG. 17C is a schematic illustration of a section of a system for converting carbonaceous fuels, according to one or more embodiments described herein;

Reference will now be made in detail to various embodiments of systems and methods for converting carbonaceous fuels, examples of which are schematically depicted in the figures. Various embodiments of the systems and methods for converting carbonaceous fuels will be described in further detail herein with specific reference to the appended drawings.

DETAILED DESCRIPTION

Disclosed herein are systems and methods for converting a solid fuel in a process utilizing circulation of an oxygen carrier solid. The systems and methods described herein provide a commercially scalable design that provides reliable process operations. The exemplary embodiments are directly applicable to chemical looping systems for the full conversion of carbonaceous fuels in solids, liquid, and/or gas form to a product gas stream comprising predominantly $CO_2$ and $H_2O$.

Figure 1:
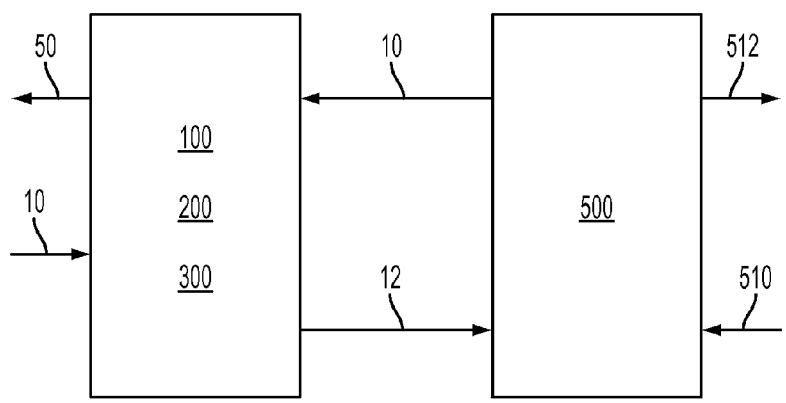
FIG. 1 is a schematic illustration of a chemical looping combustion (CLC) process, according to one or more embodiments described herein.
Figure 2:
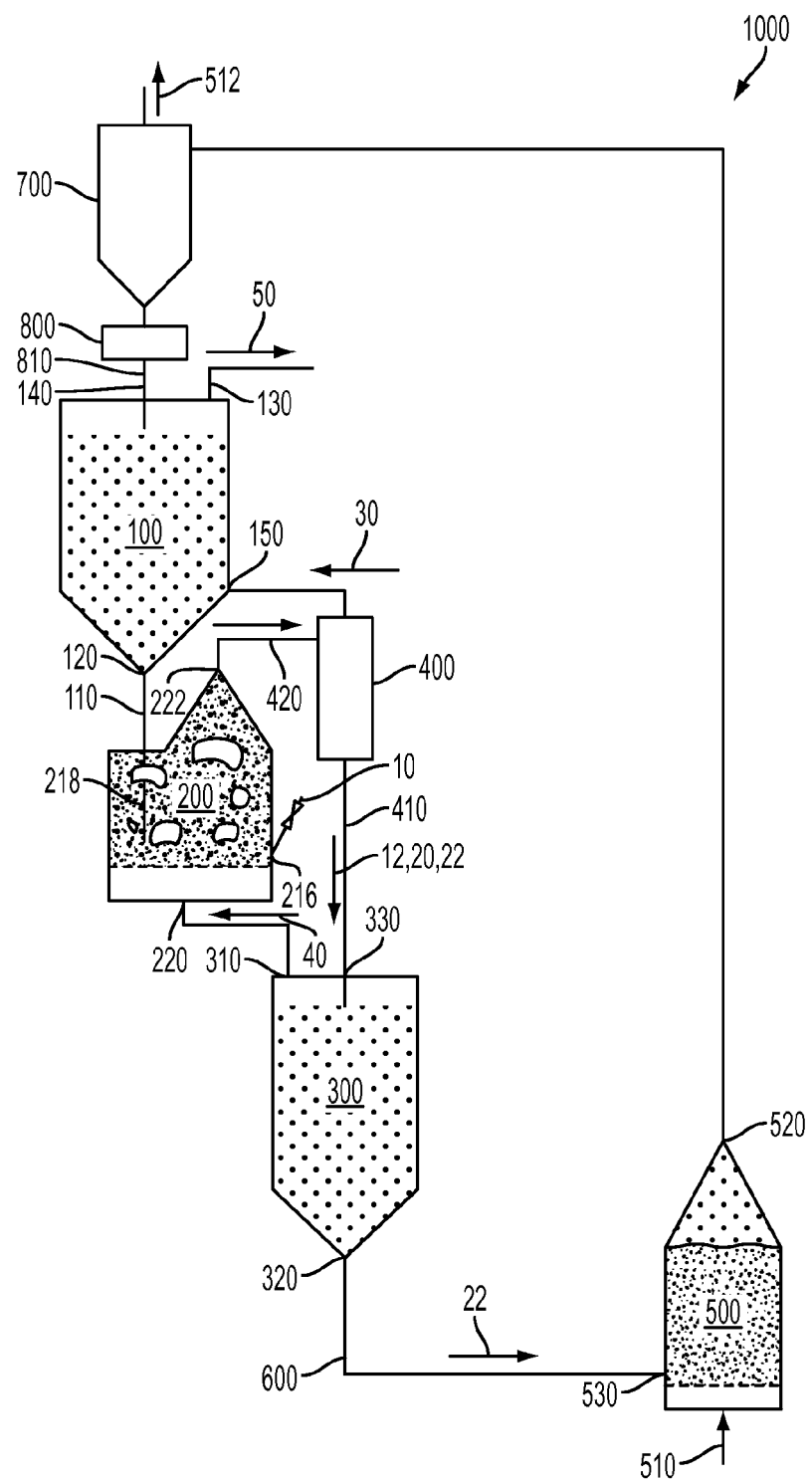
FIG. 2 is a schematic illustration of a system for converting carbonaceous fuels, according to one or more embodiments described herein.

Referring to FIG. 1, in an embodiment, multiple reactor sections are connected in series for the conversion of the solid fuel 10 with the oxygen carrier solid 20. The overall gas-solid contact pattern in the reactors may be co-current or counter-current in design. Referring to FIG. 2, in embodiments, the reactor sections include, but are not limited to, a fuel pretreatment fluidized bed reactor 200, a gaseous fuel conversion reactor 100, and a solid fuel conversion reactor 300. The gaseous fuel conversion reactor 100 and the solid fuel conversion reactor 300 are positioned with the fuel pretreatment fluidized bed reactor 200 disposed between. The solid fuel conversion reactor 300 processes predominantly solid and gaseous components/products of the solid fuel 10 and the gaseous fuel conversion reactor 100 processes predominantly gaseous components/products of the solid fuel 10.

In an embodiment, the gaseous fuel conversion reactor 100 and the solid fuel conversion reactor 300 operate as moving beds or fluidized beds. In some embodiments, multiple fluidized bed reactor sections are connected in series to form the gaseous fuel conversion reactor 100 and/or the solid fuel conversion reactor 300. The fuel pretreatment fluidized bed reactor 200 operates in a fluidized bed mode that distributes, heats, devolatilizes, and partially converts the solid fuel 10 in interaction with the oxygen carrier solid 20.

In an embodiment of the system 1000, the oxygen carrier solid 20 passes through the gaseous fuel conversion reactor 100, the fuel pretreatment fluidized bed reactor 200, and the solid fuel conversion reactor 300 to be gradually reduced and release its oxygen creating a reduced oxygen carrier solid 22, and the reduced oxygen carrier solid 22 is then transported to an oxidation reactor 500 for oxidation and regeneration.

With reference to FIG. 1, a chemical looping combustion (CLC) process replaces conventional one-step fuel combustion with two reduction-oxidation reaction schemes occurring in separate reactors. In the system 1000, oxygen carrier solid 20 is used to provide oxygen to combine with the carbon and hydrogen in the solid fuel 10 to form $CO_2$ and $H_2O$. In an embodiment, the oxygen carrier solid 20 is a metal oxide and is used to perform the reduction-oxidation reaction cycles. The metal oxide can be completely reduced to its metallic form or partially reduced to a lower oxidation state. The oxygen carrier solid 20 is then transported to the oxidizer reactor where it is oxidized with an oxygen-containing gas in an oxidation gas stream 510, such as air or $H_2O$, to a higher oxidation state.

A highly concentrated $CO_2$ stream can be obtained from the product gas stream 50 by condensing any present $H_2O$ from the product gas stream 50. The $CO_2$ can thus be directly recovered and captured without further processing. This is in contrast to conventional post combustion carbon capture techniques where a solvent, absorbent, or adsorbent is required as an add-on to separate the dilute $CO_2$ from other gases in the combustion flue gases. In the case of post combustion carbon capture solvent processes, a significant amount of energy is required to regenerate the solvent for re-use, ranging from an additional 11 to 40 percent of the gross energy output. There is no such energy penalties associated with CLC systems.

In an embodiment, the solid fuel 10 comprises solids, gases, or liquids such as, but not limited to, coal, tars, shale oil, tar/oil sands, biomass, wax, metallurgical coke, solid wastes, gasoline, oil, petroleum, diesel, jet fuel, ethanol, syngas, carbon monoxide, hydrogen, methane, and other gaseous hydrocarbons (C1-C6). The solid fuel 10 can consist of any combination of the above and are not limited to the exemplary fuel materials disclosed.

In various embodiments, direct conversion of solid fuel 10 in a circulating process of oxygen carrier solid 20 occurs in two stages: gaseous volatile conversion and gasification of the devolatilized solid fuel 12.

Referring to FIG. 2, in at least one embodiment, the system 1000 comprises a series of two counter-current packed moving bed sections: the gaseous fuel conversion reactor 100, and the solid fuel conversion reactor 300, with the fuel pretreatment fluidized bed reactor 200 disposed in-between. The solid fuel 10 is preferably well distributed in the system 1000 and fully converted to a product gas stream 50 consisting of predominantly $CO_2$ and $H_2O$. For purposes of this disclosure, predominantly $CO_2$ and $H_2O$ means the product gas stream 50 is comprised of at least 90% $CO_2$ and $H_2O$ with embodiments of at least 95%, at least 98%, at least 99%, at least 99.9%, and even at least 99.99% specifically envisioned The integrated design of the system 1000 requires minimal operational complexity allowing for reliable oxygen carrier solid 20 progression through the system 1000. The even distribution of the solid fuel 10 in the fuel pretreatment fluidized bed reactor 200 maximizes the utilization of the oxygen carrier solid 20 and the solid fuel 10.

The oxygen carrier solid 20 successively passes through the gaseous fuel conversion reactor 100, the fuel pretreatment fluidized bed reactor 200, and the solid fuel conversion reactor 300. In various embodiments, the oxygen carrier solid 20 comprises an iron oxide. The iron oxide, for example $Fe_2O_3$, is reduced from its full oxidation state of 3+ to a nearly fully reduced state between 0 and 1+. The reduced oxygen carrier solid 22 is then be re-oxidized in the oxidation reactor 500 and sent back to the top of the gaseous fuel conversion reactor 100. In the example using iron oxide ($Fe_2O_3$) the oxidation state of iron is specifically lowered from +3 to +2.66 ($Fe_3O_4$), +2 (FeO) or 0 (Fe). The reaction may be expressed as any of the following (unbalanced):

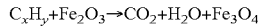

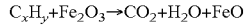

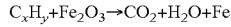

where $C_xH_y$ is the carbon-based solid fuel 10 and $Fe_2O_3$ is the oxygen carrier solid 20.

In additional embodiments, the solid fuel 10 is added into the system 1000 at the fuel pretreatment fluidized bed reactor 200 through a pretreatment reactor solid fuel inlet 216. The fuel pretreatment fluidized bed reactor 200 distributes, heats, devolatilizes, and partially converts the solid fuel 10. An off-gas 30 comprising the volatile components from the solid fuel 10, as well as remnants of other gaseous streams entering the fuel pretreatment fluidized bed reactor 200, is then sent to gaseous fuel conversion reactor 100 to be fully converted to $CO_2$ and $H_2O$. The devolatilized solid fuel 12, which is interspersed with the oxygen carrier solid 20 from the fuel pretreatment fluidized bed reactor 200, is separated from the off-gas 30 and sent to the solid fuel conversion reactor 300 to be gasified. In another embodiment, the intermediate gas 40 from the solid fuel 10 gasified in the solid fuel conversion reactor 300 is used as the fluidizing gas in the fuel pretreatment fluidized bed reactor 200 and sent to the gaseous fuel conversion reactor 100 as a component of the off-gas 30 for full solid fuel 10 conversion.

Still referring to FIG. 2, in other embodiments, oxygen carrier solid 20 enters the gaseous fuel conversion reactor 100 from oxygen carrier solid storage vessel 800 through oxygen carrier transport line 810. The oxygen carrier transport line 810 is connected to a gaseous fuel reactor oxygen carrier solid inlet 140 on the gaseous fuel conversion reactor 100. As would be familiar to one of ordinary skill in the art, the oxygen carrier solid 20 may be transferred to the gaseous fuel conversion reactor 100 via any suitable solids delivery device/mechanism. These solids delivery devices may include, but are not limited to, pneumatic devices, conveyors, lock hoppers, or the like.

In various embodiments, the gaseous fuel conversion reactor 100 comprises a counter-current gas-solids moving bed reactor. The off-gas 30 from the fuel pretreatment fluidized bed reactor 200 enters from through the gaseous fuel reactor off-gas inlet 150 near the bottom of the gaseous fuel conversion reactor 100 and the oxygen carrier solid 20 is fed from the top and discharged from the bottom. The gaseous fuel conversion reactor 100 provides a full conversion of the off-gas 30 into a product gas stream 50 consisting of a predominantly $CO_2$ and $H_2O$ rich stream, as well as partial conversion of the oxygen carrier solid 20 to a reduced oxygen carrier solid 22. The reducing degree of the oxygen carrier solid 20 in the gaseous fuel conversion reactor 100 depends on the solid fuel 10 type, operational conditions, and mole ratio between oxygen carrier solid 20 and solid fuel 10. A higher percentage of volatile in the solid fuel 10 corresponds to a higher reducing degree of the oxygen carrier solid 20 in the gaseous fuel conversion reactor 100. For example, if coal is used as solid fuel 10 and $Fe_2O_3$ used as oxygen carrier solid 20, normally $Fe_2O_3$ is reduced to around $Fe_3O_4$ in the gaseous fuel conversion reactor 100, and then further reduced to FeO/Fe in the solid fuel conversion reactor 300.

In further embodiments, the gaseous fuel conversion reactor 100 is divided into 2 or more staged fluidized/co-current bed reactors in series.

The gaseous reactant provided to the gaseous fuel conversion reactor 100 is off-gas 30 and comprises the fluidizing gas and the removed volatile components from the fuel pretreatment fluidized bed reactor 200 as well as the intermediate gas 40 which comprises the gasified fuel products from the solid fuel conversion reactor 300.

In some embodiments, the counter-current moving bed gaseous fuel conversion reactor 100 has a short residence time needed for gaseous reactants. The residence time in the gaseous fuel conversion reactor 100 is in the range of less than approximately one second to approximately 5 minutes. In further embodiments, the residence time in the gaseous fuel conversion reactor 100 is approximately 1 second to approximately 3 minute. In still further embodiments, the residence time in the gaseous fuel conversion reactor 100 of the off-gas 30 is approximately 1 second to approximately 1 minute. For example, a residence time in the gaseous fuel conversion reactor 100 of the off-gas 30 of approximately 1 second to approximately 1 minute for CO and $H_2$, a residence time of less than approximately 5 seconds, for $CH_4$, and a residence time of approximately 10 to 15 seconds for other carbonaceous gases are desired. The diameter and height of the gaseous fuel conversion reactor 100 determine residence time in conjunction with the flow rate of the off-gas 30 provided to the gaseous fuel conversion reactor 100. The desired residence time of the off-gas 30 for full conversion is dependent on operating temperature and composition of both the gaseous and solid species.

In embodiments, the residence time of the oxygen carrier solid 20 is much longer than the residence time of the gaseous reactants. The residence time of the oxygen carrier solid 20 is between approximately 30 minutes and approximately 90 minutes for the different particles of the oxygen carrier solid 20 used. The temperature has an influence on the residence time of reactants. For example, when the temperature decreases, the reaction rate decreases dramatically. For a temperature over approximately 750° C., the residence time of volatiles would be in seconds.

In embodiments, the gas velocity through the gaseous fuel conversion reactor 100 is less than the minimum fluidization velocity of the oxygen carrier solid 20 under the moving bed operational conditions. The design of the gaseous fuel conversion reactor 100 is governed by the reaction kinetics of gaseous fuels, the reduction kinetics of oxygen carrier solid 20, the hydrodynamic characteristics of the oxygen carrier solid 20, the properties and composition of the off-gas 30, and operational conditions of the gaseous fuel conversion reactor 100. For example, in an embodiment, the operating temperature of gaseous fuel conversion reactor 100 is in the range of approximately 500° C. to approximately 1250° C. and the operating pressure is in the range from approximately 1 to approximately 50 bars, depending on the requirements of potential downstream processes such as heat recovery, flue gas purification, and sequestration. In a further embodiment, the operating temperature of gaseous fuel conversion reactor 100 is in the range of approximately 750° C. to approximately 900° C. and the operating pressure is approximately ambient pressure. In still a further embodiment, when high pressure $CO_2$ is desired downstream, the operating pressure is at or above 10 atm.

Still referring to FIG. 2, in at least one embodiment, a pretreatment oxygen carrier feed line 110 is used to transfer the mixture of oxygen carrier solid 20 and reduced oxygen carrier solid 22 into the fuel pretreatment fluidized bed reactor 200 where oxygen carrier solid 20 and solid fuel 10 are distributed due to the hydrodynamic characteristics of the fluidized bed mode of operation. The pretreatment oxygen carrier feed line 110 connects the gaseous fuel reactor oxygen carrier solid outlet 120 of the gaseous fuel conversion reactor 100 and the pretreatment reactor oxygen carrier inlet 218 of the fuel pretreatment fluidized bed reactor 200.

In another embodiment, solid fuel 10 is fed into the bottom section of the fuel pretreatment fluidized bed reactor 200 where the solid fuel 10 is rapidly heated and devolatilized. In accordance with various embodiments, the solid fuel 10 may be coal, tars, oil shales, oil sands, tar sand, biomass, wax, coke, solid waste, and/or other carbonaceous fuels.

The fuel pretreatment fluidized bed reactor 200, in various embodiments, is operated in a binary-solids fluidized bed mode with oxygen carrier solid 20 and solid fuel 10. A function of the oxygen carrier solid 20 in this chamber is to supply the thermal heat required for devolatilization of the solid fuel 10. The fluidization of the oxygen carrier solid 20 also provides agitation to decrease or eliminate the agglomeration tendencies present in some solid fuel 10, such as caking coals. The fluidized bed operation mode of the fuel pretreatment fluidized bed reactor 200 also provides mixing of the oxygen carrier solid 20 with the solid fuel 10. The fluidization of the oxygen carrier solid 20 in the fuel pretreatment fluidized bed reactor 200 provides rapid heat transfer among particles of the oxygen carrier solid 20 to prevent temperature non-uniformity while reducing agglomeration issues present in some solid fuels 10.

In multiple embodiments, the fluidization gas for the fuel pretreatment fluidized bed reactor 200 is the intermediate gas 40 from the solid fuel conversion reactor intermediate gas outlet 310 of solid fuel conversion reactor 300. In further embodiments, the intermediate gas 40 is a mixture of CO, $CO_2$, $CH_4$, $H_2$, $H_2O$, and heavier hydrocarbons. The intermediate gas 40 composition is dependent on gases introduced into the solid fuel conversion reactor 300, the solid fuel 10 utilized, operating temperature, and composition of the oxygen carrier solid 20.

In further embodiments depicted in FIG. 2, the mixture of devolatilized solid fuel 12 and oxygen carrier solid 20 then pass through a pretreatment gas-solids separation unit 400 and are transported to solid fuel conversion reactor 300 through pretreated solids transport line 410 connected to a solid fuel conversion reactor inlet 330. The gaseous components of the stream exiting the pretreatment reactor discharge 222 are sent as off-gas 30 to the gaseous fuel conversion reactor 100.

In various embodiments, the solid fuel conversion reactor 300 operates in a counter-current gas-solids moving bed mode. The diameter and height of solid fuel conversion reactor 300 is determined to satisfy the desired residence time required for the gasification of devolatilized solid fuel 12 and conversion of the oxygen carrier solid 20. In an embodiment, the residence time in the solid fuel conversion reactor 300 is approximately 5 minutes to approximately 1 hour. In a further embodiment, the residence time in the solid fuel conversion reactor 300 is approximately 15 minutes to approximately 45 minutes. In still a further embodiment, the residence time in the solid fuel conversion reactor 300 is approximately 20 minutes to approximately 40 minutes.

In further embodiments, a conversion enhancement gas 350 is used to enhance the conversion of the devolatilized solid fuel 12 in the solid fuel conversion reactor 300. In an embodiment, the conversion enhancement gas 350 comprises primarily $H_2O$ and $CO_2$. In another embodiment, the conversion enhancement gas 350 comprises a recycled split stream from the product gas stream 50 exiting the gaseous fuel conversion gas outlet 130 of gaseous fuel conversion reactor 100. In yet another embodiment, conversion enhancement gas 350 is not utilized, as the oxygen carrier solid 20 provides the gasification of the devolatilized solid fuel 12, such as in the case of atomic oxygen uncoupling from a metal oxide material.

In at least one embodiment, the conversion enhancement gas 350 flow rate to solid fuel conversion reactor 300 is up to 40 mol % of the carbon molar flow rate in the devolatilized solid fuel 12. In further embodiments, the conversion enhancement gas 350 flow rate to solid fuel conversion reactor 300 is up to 10 mol %, up to 20 mol %, up to 30 mol %, up to 50 mol %, or up to 60 mol % of the carbon molar flow rate in the devolatilized solid fuel 12. As the gasification of solid fuel 10 or devolatilized solid fuel 12 is a gas producing process, the total gas flow rate naturally gradually increases from the bottom to the top of the solid fuel conversion reactor 300 due to evolving gas from partial oxidation of the devolatilized solid fuel 12. The solid fuel conversion reactor 300 is designed such that the gas velocity through the solid fuel conversion reactor 300 is maintained below the minimum fluidization velocity of the oxygen carrier solid 20. Maintaining the gas velocity below the minimum fluidization velocity of the oxygen carrier solid 20 keeps the solid fuel conversion reactor 300 in the moving bed mode.

During conversion in the solid fuel conversion reactor 300, the devolatilized solid fuel 12 gradually reduces in size as a result of its gasification and eventually turns to ash 60. In an exemplary embodiment, the devolatilized solid fuel 12 is maintained in solid fuel conversion reactor 300 in the fluidized state while the ash 60 produced is entrained out of the solid fuel conversion reactor 300 due to the small ash 60 size and density. The design of the solid fuel conversion reactor 300 is governed by the kinetics of the gasification of fixed carbon, the kinetics of oxygen carrier solid 20, the hydrodynamic characteristics of the oxygen carrier solid 20 and the solid fuel 10, the composition of solid fuel 10, as well as the operational conditions of the solid fuel conversion reactor 300. In an embodiment, the operational temperature of the solid fuel conversion reactor 300 is in the range of approximately 500° C. to approximately 1250° C. and the operational pressure is in the range from approximately 1 bar to approximately 50 bars, depending on the requirement of potential downstream processes such as heat recovery, flue gas purification, and sequestration. In a further embodiment, the operating temperature of solid fuel conversion reactor 300 is in the range of approximately 750° C. to approximately 900° C. and the operating pressure is approximately ambient pressure. In still a further embodiment, when high pressure $CO_2$ is desired downstream, the operating pressure is at or above 10 atm.

Referring again to FIG. 2, to regenerate the reduced oxygen carrier solid 22, the system 1000, in embodiments, includes an oxidation reactor 500. The oxidation reactor 500 is configured in a fluidized bed mode with air or other oxygen-containing gas from an oxidation gas stream 510. In further embodiments, the oxidation reactor 500 releases heat during the oxidation of reduced oxygen carrier solid 22. Such heat may be extracted for steam and/or power generation or used for internal process heat requirements. In some embodiments, the oxidation reactor 500 comprises an air filled line or tube used to oxidize the reduced oxygen carrier solid 22. In further embodiments, the oxidation reactor 500 is a heat recovery unit. In still further embodiments, the oxidation reactor 500 is a turbulent fluidized bed wherein enhanced contact between reduced oxygen carrier solid 22 and the oxygen containing oxidation gas stream 510 may be achieved.

In some embodiments, the oxygen carrier solid 20 is capable of undergoing numerous reduction-oxidation reaction regeneration cycles.

In embodiments of a fluidized bed oxidation reactor 500, the diameter and height of the oxidation reactor 500 are designed to ensure full and uniform oxidation of reduced oxygen carrier solid 22 with minimal operating costs. The design is governed by the kinetics and hydrodynamics of reduced oxygen carrier solid 22, stoichiometric ratio between reduced oxygen carrier solid 22 and oxidation gas stream 510, as well as the operational conditions of the oxidation reactor 500. In an exemplary embodiment, the operational temperature of oxidation reactor 500 is in the range of approximately 600° C. to approximately 1250° C. and the operational pressure is in the range from approximately 1 bar to approximately 50 bars, depending on the requirement of potential downstream processes such as heat recovery, flue gas purification, and sequestration. A relatively higher temperature in the upper end of the disclosed range is preferred as higher gas temperature gives a higher efficiency for secondary processes such as electricity generation.

Reduced oxygen carrier solid 22 is delivered to the oxidation reactor 500 through the use of non-mechanical seal 600 that will be described hereafter.

The oxygen carrier solid 20 generated from the oxidation of the reduced oxygen carrier solid 22 is transported from oxidation reactor 500 to oxygen carrier solid storage vessel 800 through an oxidizer gas-solids separation unit 700, in various embodiments. In one embodiment, pneumatic transport methods, such as a riser, are used with an oxygen depleted oxidation gas stream 512 as carrying gas to make the process more economically feasible. The oxygen depleted oxidation gas stream 512 representing the oxidation gas stream 510 after giving up oxygen molecules to oxidize the reduced oxygen carrier solid 22 and exits an oxidation reactor discharge 520 of the oxidation reactor 500.

In multiple embodiments, the oxidizer gas-solids separation unit 700 separates oxygen depleted oxidation gas in the oxygen depleted oxidation gas stream 512 and attrited solids from relatively larger oxygen carrier solid 20. In an embodiment, the oxidizer gas-solids separation unit 700 is a cyclone with a designed cut-off particle size and efficiency. In an embodiment, the cut-off particle size of the cyclone oxidizer gas solids separation unit 700 is particles larger than approximately 5 microns. In a further embodiment, the oxidizer gas-solids separation unit 700 is a disengagement chamber configured such that solid particles with a diameter less than a designed value are entrained and carried by the gas flow while larger particles, such as oxygen carrier solid 20, flow downwards as driven by gravity. In an embodiment, the cut-off particle size of the disengagement chamber oxidizer gas solids separation unit 700 is particles larger than approximately 50 microns. In a further embodiment, the cut-off particle size of the disengagement chamber oxidizer gas solids separation unit 700 is particles larger than approximately 100 microns. In yet another embodiment, a cyclone and a disengagement device are utilized in series for desired fine removal effectiveness and efficiency. Other methods for separating fine particles from bulk solids, through either non-mechanical or mechanical means, such as sieving and other methods known to one having ordinary skill in the art may be used.

In an embodiment, the oxygen carrier solid discharged from the oxidizer gas-solids separation unit 700 are stored in the oxygen carrier solid storage vessel 800. In further embodiments, the oxygen carrier solid storage vessel 800 is sealed from the gaseous fuel conversion reactor 100 with a zone seal or other non-mechanical seal 600.

Figure 3:
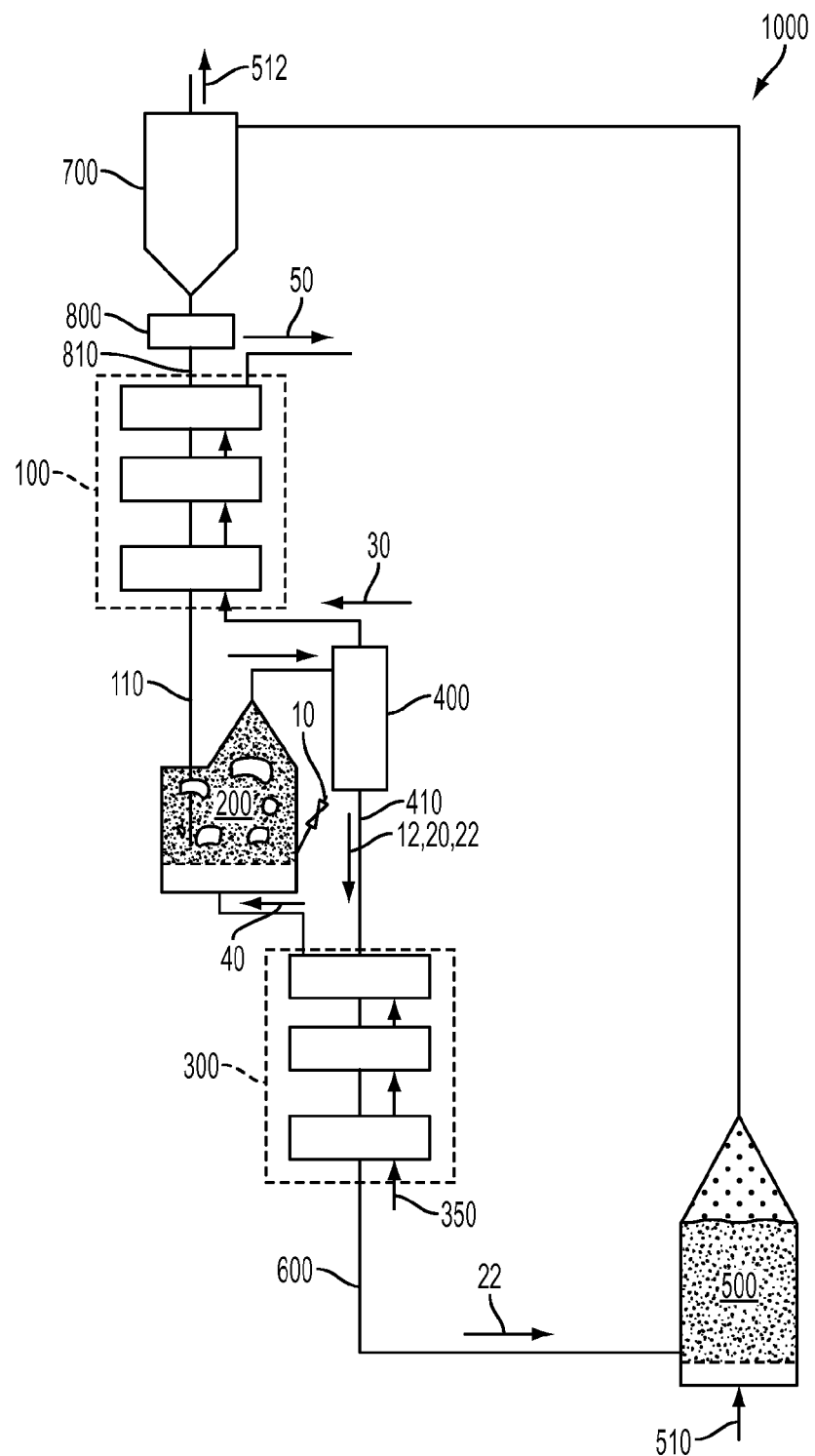
FIG. 3 is a schematic illustration of a system for converting carbonaceous fuels, according to one or more embodiments described herein.

Now referring to FIG. 3, in some embodiments, the gaseous fuel conversion reactor 100 and the solid fuel conversion reactor 300, which are in counter-current moving bed mode in FIG. 2, are replaced by a series of fluidized bed reactors, moving bed reactors, or a combination of fluidized bed and moving bed reactors.

Figure 4A:
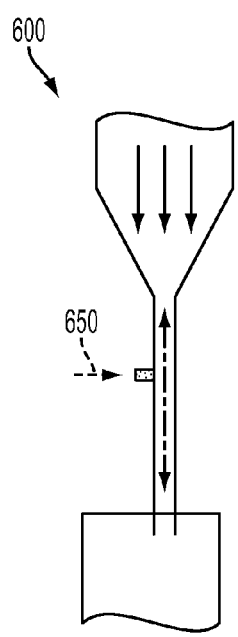
FIG. 4A is a schematic illustration of a non-mechanical seal, according to one or more embodiments described herein.
Figure 4B:
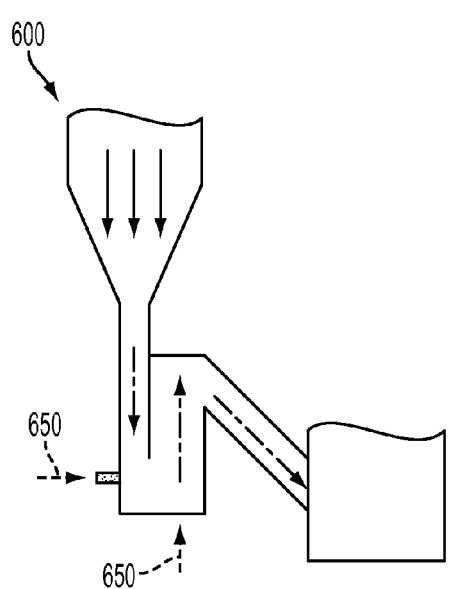
FIG. 4B is a schematic illustration of a non-mechanical seal, according to one or more embodiments described herein.

Referring to FIGS. 4A and 4B, in further embodiments, the non-mechanical seal 600 is used to prevent gaseous species from transferring between reactors while allowing solids to pass through. In an embodiment, the non-mechanical seal 600 prevents gases generated in the solid fuel conversion reactor 300 from transferring to the oxidation reactor 500 while allowing the reduced oxygen carrier solid 22 to pass through. In a further embodiment, the non-mechanical seal 600 prevents the oxidation gas stream 510 from transferring to the solid fuel conversion reactor 300 while allowing the reduced oxygen carrier solid 22 to transfer from the solid fuel conversion reactor 300 to the oxidation reactor 500. In still a further embodiment, the non-mechanical seal 600 prevents gas mixing between product gas stream 50 in gaseous fuel conversion reactor 100 and oxygen depleted oxidation gas stream 512 in oxidizer gas-solids separation unit 700. In various embodiments, the non-mechanical seal 600 is a zone seal standpipe as illustrated in FIG. 4A and in further embodiments is a loop seal as illustrated in FIG. 4B. The zone seal standpipe and loop seal can also be used to offset the pressure difference between the solid fuel conversion reactor oxygen carrier solid outlet 320 at the bottom of solid fuel conversion reactor 300 and the reduced oxygen carrier solid inlet 530 of oxidation reactor 500. Other like non-mechanical seals 600 may also be used for gas sealing at said locations.

Referring to FIG. 4A, the zone seal standpipe is in the form of a hollow conduit having a first end communicating with the outlet of one reactor and a second end communicating with the inlet of a second reactor. Aeration gas 650 is injected into the zone seal standpipe so that the aeration gas 650 can travel both upwards against solids flow and downwards with solids flow, as shown by the directional arrows. There can be either single or multiple injection points of the aeration gas 650.

Figure 5A:
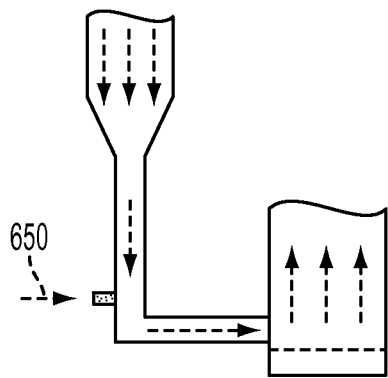
FIG. 5A is a schematic illustration of a valve, according to one or more embodiments described herein.
Figure 5B:
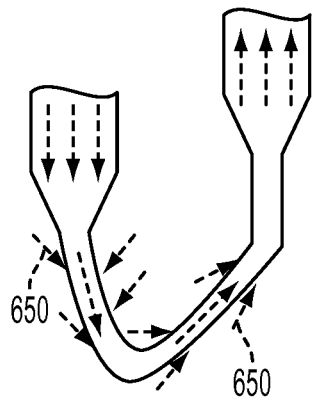
FIG. 5B is a schematic illustration of a valve, according to one or more embodiments described herein.
Figure 5C:
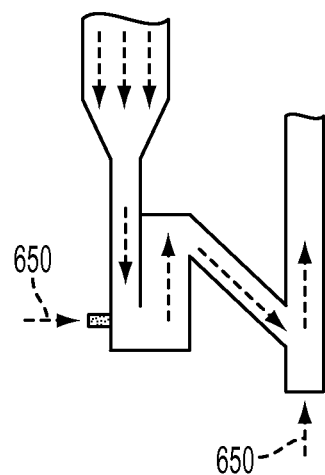
FIG. 5C is a schematic illustration of a valve, according to one or more embodiments described herein.

In further embodiments of the system 1000, the circulation rate of the oxygen carrier solid 20 is controlled by an oxygen carrier solid circulation device 610 installed between the solid fuel conversion reactor 300 and the oxidation reactor 500. The oxygen carrier solid circulation device provides control of the oxygen carrier solid circulation rate and prevents gas mixing between the solid fuel conversion reactor 300 and the oxidation reactor 500. Referring to FIGS. 5A to 5C, in various embodiments the oxygen carrier solid circulation device 610 is an L-valve (FIG. 5A), J-valve (FIG. 5B), or H-valve (FIG. 5C). The oxygen carrier solid circulation device 610 controls the oxygen carrier solid circulation rate and prevents gas mixing between the solid fuel conversion reactor 300 and the oxidation reactor 500. In addition, one or more of the aforementioned standpipe/loop seals can also be replaced by a reversed V-valve, L-valve, J-valve, or H-valve.

The non-mechanical seal 600 provides pressure differences across the system 1000. An embodiment of a system pressure profile is provided in FIG. 6, assuming the pressures at the oxygen depleted gas stream outlet exiting the oxidizer gas-solids separation unit 700 and product gas stream 50 exiting the gaseous fuel conversion reactor 100 are the same. The system pressure balance is obtained and controlled by the operation of the non-mechanical seals 600.

Figure 6:
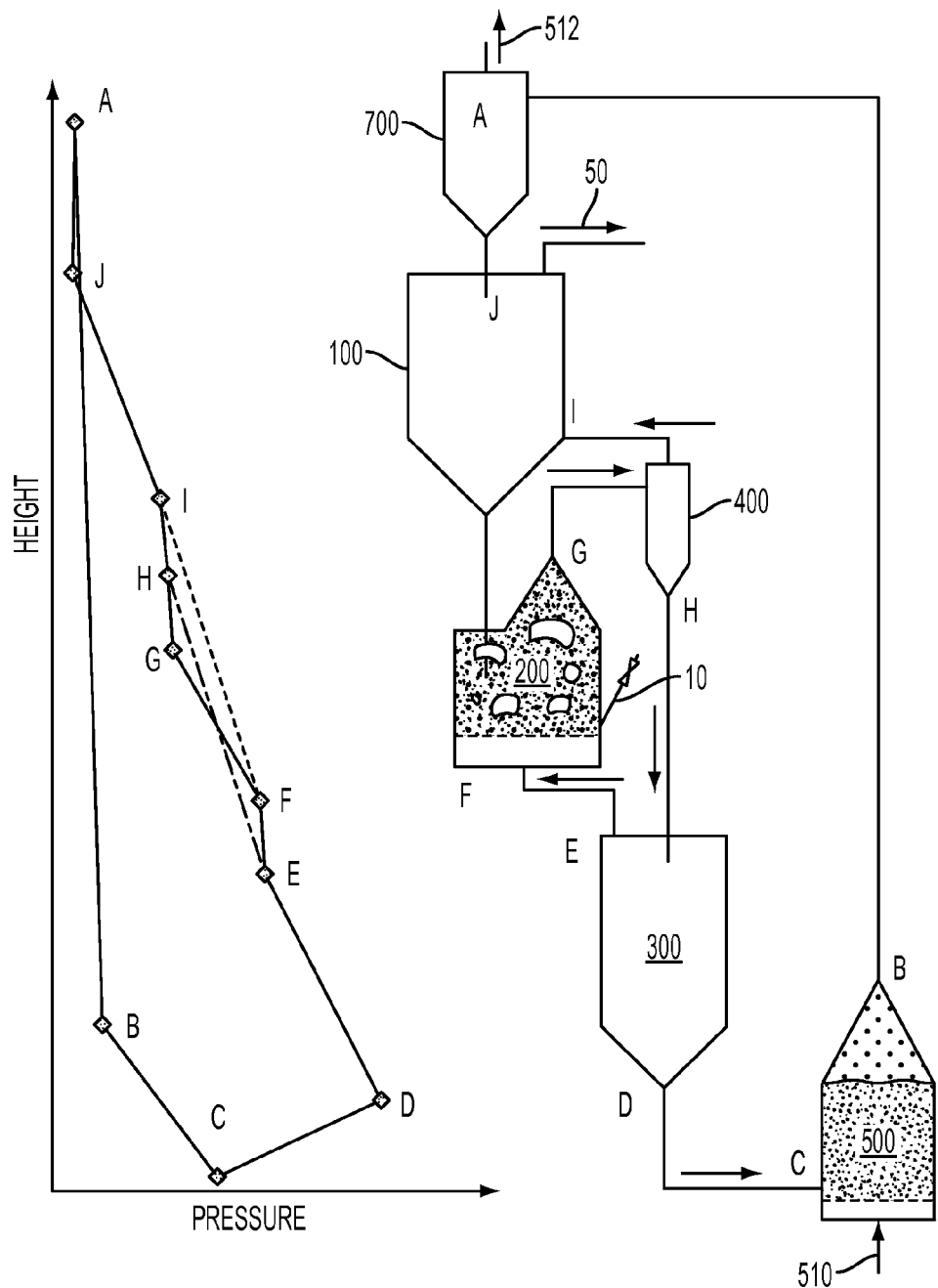
FIG. 6 is a system for converting carbonaceous fuels and pressure profile, according to one or more embodiments described herein.
Figure 7:
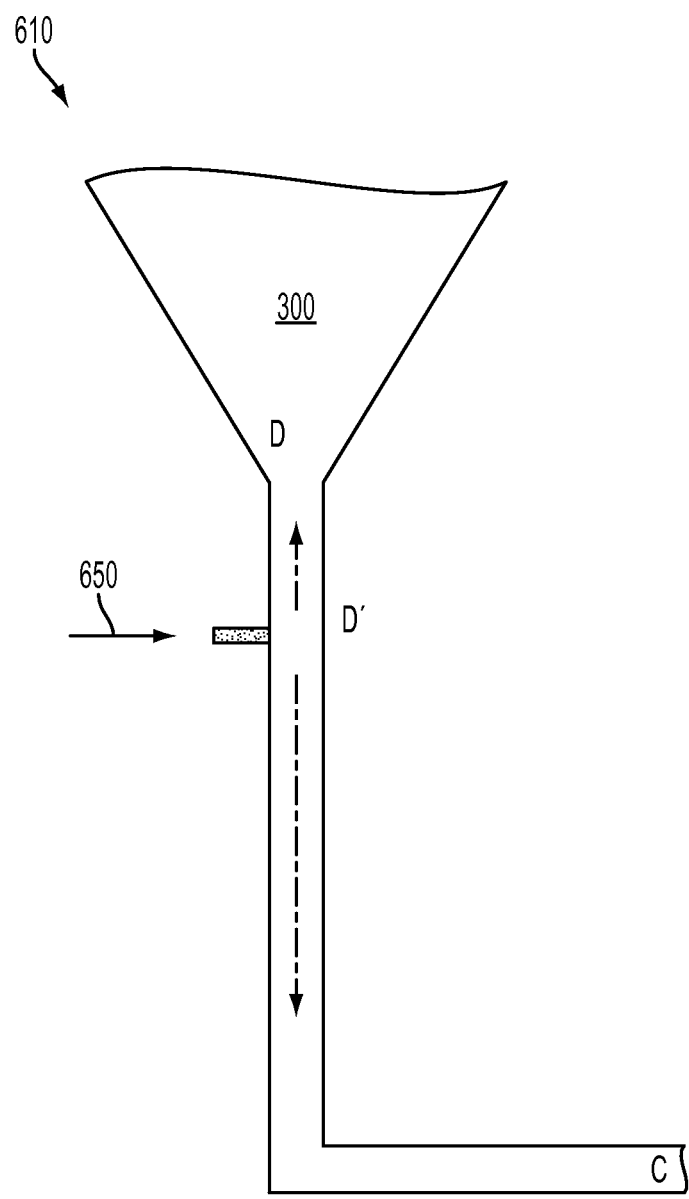
FIG. 7 is a schematic illustration of an oxygen carrier solid circulation device, according to one or more embodiments described herein.

Referring to FIG. 6, the pressure difference between points A and B represents the pressure drop from oxidation reactor 500 to oxidizer gas-solids separation unit 700. The pressure differences between points B and C, points D and E, points F and G, and points I and J, represent the pressure drops in the oxidation reactor 500, solid fuel conversion reactor 300, fuel pretreatment fluidized bed reactor 200 and gaseous fuel conversion reactor 100, respectively. The pressure differences between points E and F, points H and I are pressure head loss due to wall friction of pipes connecting the reactors. The pressure difference between G and H is the pressure drop due to pretreatment gas-solids separation unit 400. The pressure difference between points C and D is due to the pressure difference between the solid fuel conversion reactor 300 and oxidation reactor 500. It is desirable that the non-mechanical seal 600 between the solid fuel conversion reactor 300 and oxidation reactor 500 and oxygen carrier solid circulation device 610 generate a locally high pressure point between points C and D so that gas mixing from each reactor section can be prevented. With reference to FIG. 7, in an embodiment, a locally high pressure point between points C and D is achieved by locating a zone seal gas injection point D' near the top when a zone seal standpipe is used as non-mechanical seal 600. Thus, a larger pressure drop may be generated from point D' to point D than from point D' to point C and the pressure difference between points D and C are offset.

Figure 8:
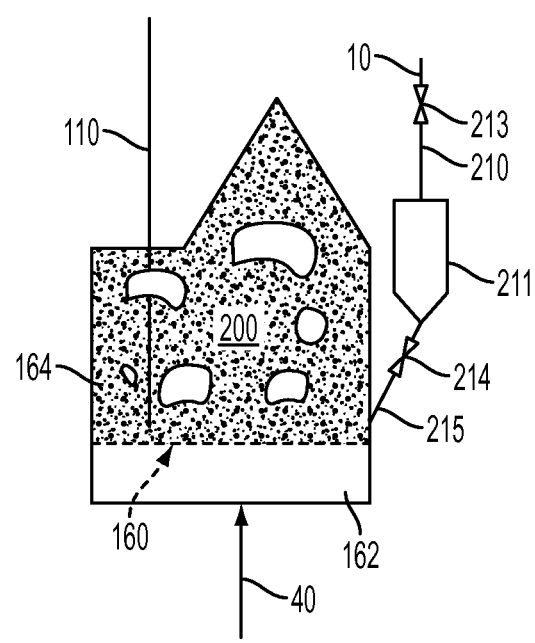
FIG. 8 is a side cross-sectional view of a fuel pretreatment fluidized bed reactor, according to one or more embodiments described herein.

With reference to FIG. 8, in multiple embodiments, the fuel pretreatment fluidized bed reactor 200 comprises a meshed gas distributor 160 to distribute the intermediate gas 40 uniformly and hold fluidized particles inside the fuel pretreatment fluidized bed reactor 200. The meshed gas distributor separates a gas introduction zone 162 from a solids mixing zone 164. Solid fuel 10 is fed through a hopper outlet line 215 into the bottom of the solids mixing zone 164 of fuel pretreatment fluidized bed reactor 200 proximal the meshed gas distributor 160. A fuel introduction lock hopper 211 with hopper valves 213, 214 control the feeding of the solid fuel 10, such as coal, tars, oil shales, oil sands, tar sand, biomass, wax, coke, solid wasters, garbage, land filled wastes, and other carbonaceous fuels. In various embodiments, the solid fuel 10 may be caking or non-caking, such as bituminous coal, anthracite coal, lignite, and biomass. When the fuel introduction lock hopper 211 is filled with a selected amount of solid fuel 10, a hopper inlet valve 213, in the hopper inlet line 210, is closed. A hopper outlet valve 214, in the hopper outlet line 215, is opened and the solid fuel 10 in the fuel introduction lock hopper 211 is passed through the hopper outlet line 215 to the fuel pretreatment fluidized bed reactor 200. In another embodiment, the fuel introduction lock hopper 211 is not utilized and one of other methods known to one skilled in the art of injecting solids into a fluidized bed reactor is used.

Figure 9A:
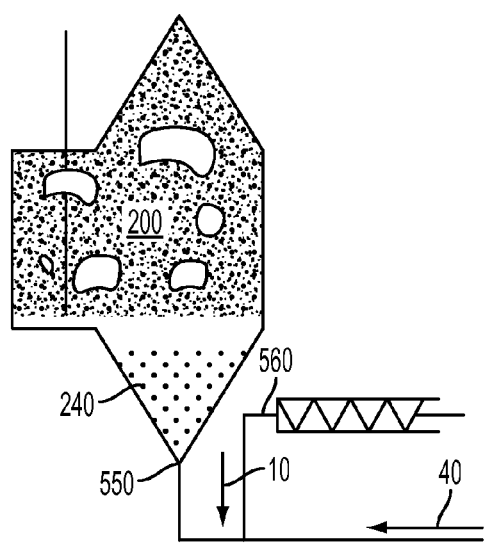
FIG. 9A is a side cross-sectional view of a fuel pretreatment fluidized bed reactor, according to one or more embodiments described herein.
Figure 9B:
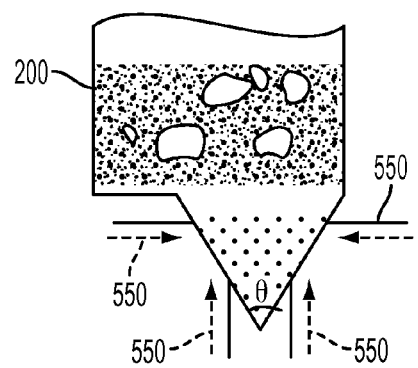
FIG. 9B is a side cross-sectional view of a fuel pretreatment fluidized bed reactor, according to one or more embodiments described herein.

In at least one embodiment, referring now to FIGS. 9A and 9B, the solid fuel 10 is injected into the fuel pretreatment fluidized bed reactor 200 via a gas-solids jet 550. Utilization of the gas-solids jet 550 allows a meshed gas distributor 160 to be omitted. The fuel pretreatment fluidized bed reactor 200 comprises a substantially cone shaped bottom 240 in communication with the gas-solids jet 550. In another embodiment, the carrier gas that transports solid fuel 10 into the substantially cone shaped bottom 240 of the fuel pretreatment fluidized bed reactor 200 is the intermediate gas 40 from solid fuel conversion intermediate gas outlet of solid fuel conversion reactor 300. In further embodiments, the solid fuel 10 is delivered into the gas-solids jet transport line 560 for introduction to the fuel pretreatment fluidized bed reactor 200 using a lock hopper (not shown). In still further embodiments, the solid fuel 10 is delivered into the gas-solids jet transport line 560 for introduction to the fuel pretreatment fluidized bed reactor 200 using a screw feeder.

In embodiments, the substantially cone shaped bottom 240 of the fuel pretreatment fluidized bed reactor 200 is configured such that gas velocity inside the substantially cone shaped bottom 240 is higher than the terminal velocity of the oxygen carrier solid 20. The gas-solids flow enters into the fuel pretreatment fluidized bed reactor 200 from underneath the cone and is propelled from the gas-solids jets 550 into the fluidized bed of oxygen carrier solid 20. In further embodiments, the number, locations and orientations of the injection nozzles of the gas-solids jets 550 provide smooth operation and uniform distribution of fluidizing gas and solid fuel 10 into the fuel pretreatment fluidized bed reactor 200.

Figure 10A:
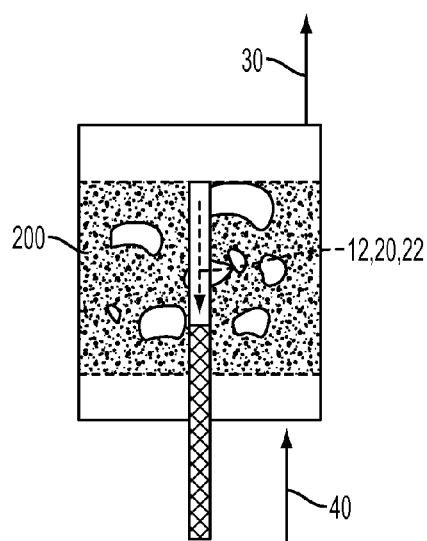
FIG. 10A is a side cross-sectional view of a fuel pretreatment fluidized bed reactor, according to one or more embodiments described herein.
Figure 10B:
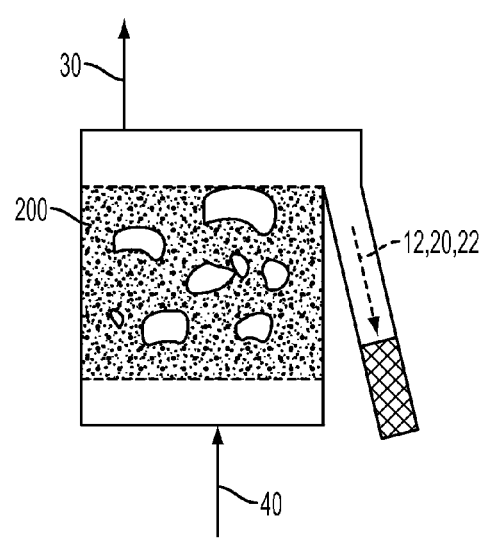
FIG. 10B is a side cross-sectional view of a fuel pretreatment fluidized bed reactor, according to one or more embodiments described herein.

In various embodiments, the fuel pretreatment fluidized bed reactor 200 is an overflow fluidized bed, as shown in FIGS. 10A and 10B, so that the off-gas 30 and the solids mixture of oxygen carrier solid 20 and devolatilized solid fuel 12 are separated and sent to gaseous fuel conversion reactor 100 and solid fuel conversion reactor 300, respectively. In an embodiment, with reference to FIG. 10A, the overflow device for solids discharge of oxygen carrier solid 20 and devolatilized solid fuel 12 is centrally located in the fuel pretreatment fluidized bed reactor 200. In another embodiment, with reference to FIG. 10B, the overflow device for solids discharge of oxygen carrier solid 20 and devolatilized solid fuel 12 is located at the edge of the fuel pretreatment fluidized bed reactor 200. In various embodiments, the gas outlet is located a certain distance from the opening of the overflow device so that the oxygen carrier solid 20 and devolatilized solid fuel 12 will not be entrained by the gas flow. In further embodiments, multiple overflow devices and/or gas outlets are installed on the fuel pretreatment fluidized bed reactor 200.

Figure 11A:
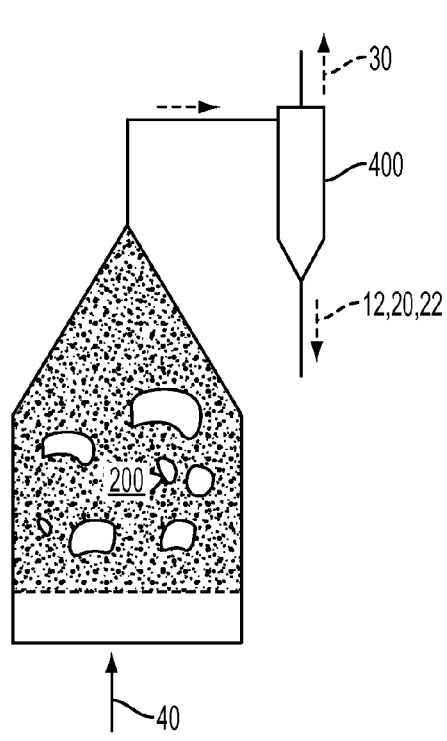
FIG. 11A is a side cross-sectional view of a fuel pretreatment fluidized bed reactor and pretreatment gas-solids separation unit, according to one or more embodiments described herein.
Figure 11B:
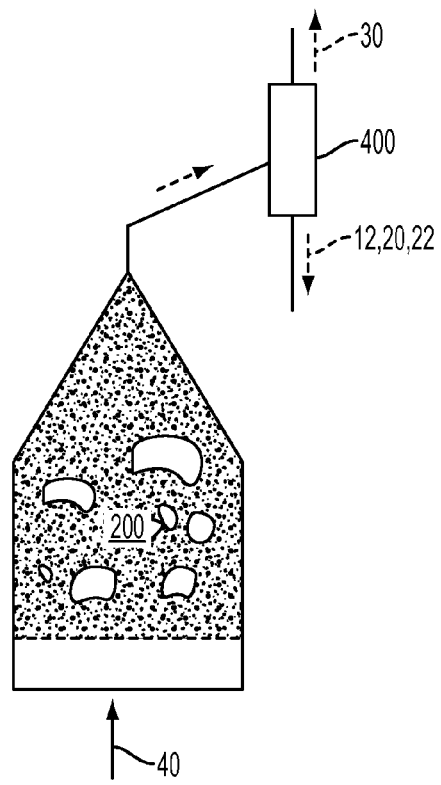
FIG. 11B is a side cross-sectional view of a fuel pretreatment fluidized bed reactor and pretreatment gas-solids separation unit, according to one or more embodiments described herein.

In further embodiments, the off-gas 30, oxygen carrier solid 20, and devolatilized solid fuel 12 are entrained from the top of the fuel pretreatment fluidized bed reactor 200. The gas-solids flow is then transported through a pretreatment discharge line 420 and separated in pretreatment gas-solids separation unit 400, as shown in FIG. 2 for example. Referring to FIG. 11A, in embodiments, the pretreatment gas-solids separation unit 400 is a cyclone, which separates solids with a diameter as small as microns from gas flow. Referring to FIG. 11B, in further embodiments, the pretreatment gas-solids separation unit 400 is a disengagement pipe that separates solids from gas flow with a determined cut-off size. In an embodiment the disengagement pipe separates solids from gas flow with a particle size cut-off of approximately 700 micrometers. In an embodiment the oxygen carrier solid 20 particle size is approximately 1 mm to proximally 2 mm and thus is sufficiently large for separation by the pretreatment gas-solids separation unit 400. Other methods of separating solids from gas flow known to one having ordinary skill in the art may also be utilized.

Figure 12:
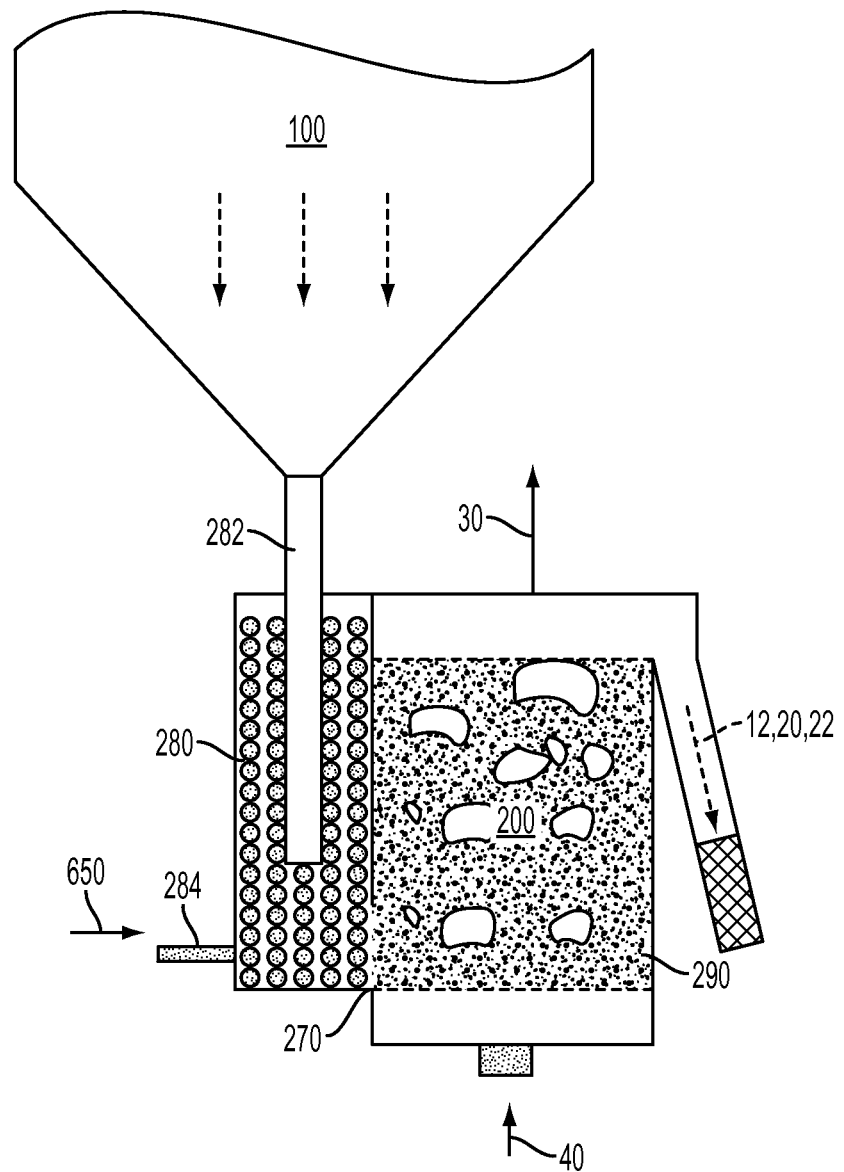
FIG. 12 is a side cross-sectional view of a fuel pretreatment fluidized bed reactor, according to one or more embodiments described herein.

Referring to the embodiment of FIG. 12, the fuel pretreatment fluidized bed reactor 200 comprises a supply chamber 280 and a mixing chamber 290. The supply chamber 280 of the fuel pretreatment fluidized bed reactor 200 assist in transfer of oxygen carrier solid 20 from the gaseous fuel reactor oxygen carrier solid outlet 120 of the gaseous fuel conversion reactor 100 to the fuel pretreatment fluidized bed reactor 200 without backflow of oxygen carrier solid 20. The oxygen carrier solid 20 flows from supply chamber 280 to mixing chamber 290 through crossflow slit 270, an opening between supply chamber 280 and mixing chamber 290. In an embodiment, a moving bed standpipe 282 from the bottom of gaseous fuel conversion reactor 100 is connected to the supply chamber 280. An aeration inlet 284 disposed on the bottom or the side of the supply chamber 280 provides aeration gas 650 to propel the oxygen carrier solid 20 through the crossflow slit 270 to the mixing chamber 290. In various embodiments, the aeration gas 650 is a split stream of intermediate gas 40 from solid fuel conversion reactor 300. Further, the mixing chamber 290 is fluidized with the stream of intermediate gas 40 from solid fuel conversion reactor 300. In some embodiments, the moving bed standpipe 282 has a smaller inner diameter (ID) than the gaseous fuel conversion reactor 100. In further embodiment, the length of the moving bed standpipe 282 is longer than the bed height of the mixing chamber so that gas leakage from fuel pretreatment fluidized bed reactor 200 to gaseous fuel conversion reactor 100 through the moving bed standpipe 282 is minimal.

Figure 13:
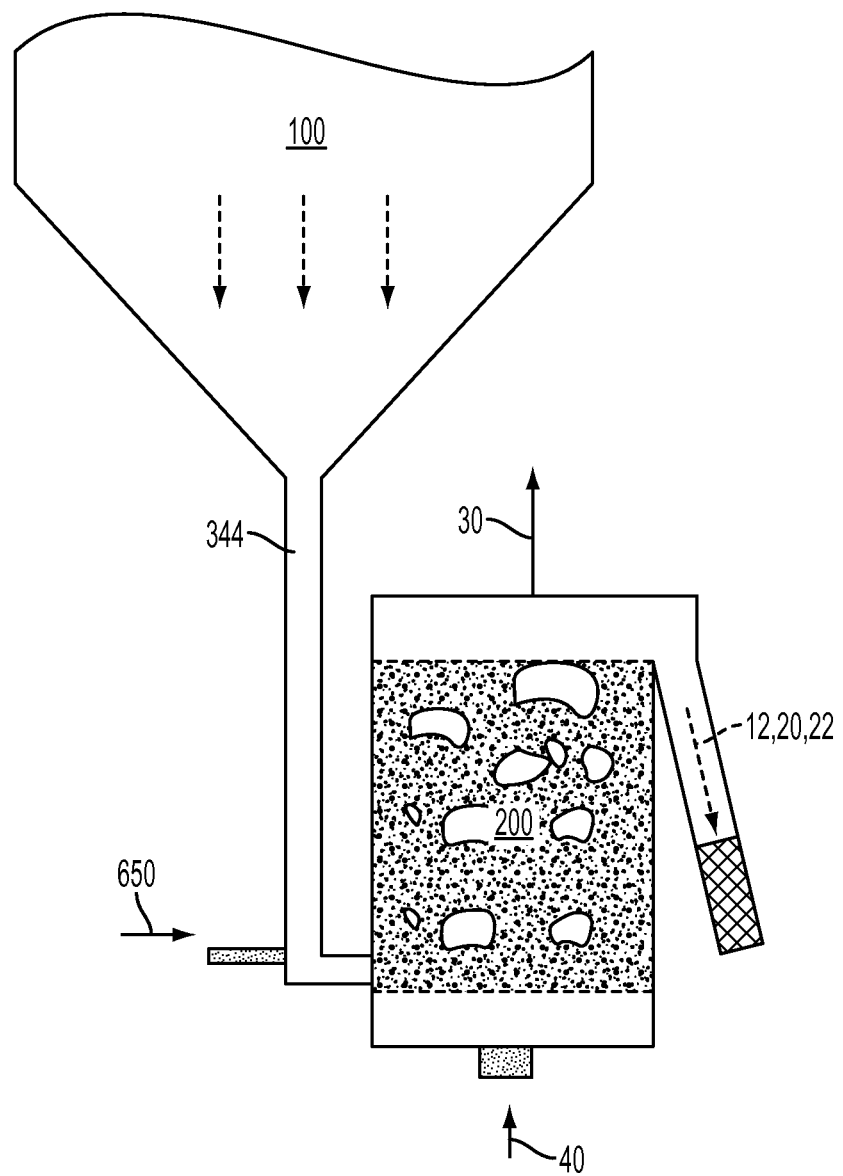
FIG. 13 is a side cross-sectional view of a fuel pretreatment fluidized bed reactor, according to one or more embodiments described herein.

In other embodiments depicted in FIG. 13, an L-valve provides controllable oxygen carrier solid 20 flow from gaseous fuel conversion reactor 100 to fuel pretreatment fluidized bed reactor 200. An aeration gas 650 propels oxygen carrier solid 20 into the fuel pretreatment fluidized bed reactor 200 and prevents backflow of gases and solids in the fuel pretreatment fluidized bed reactor 200. In an embodiment, the aeration gas 650 is provided from a split stream of intermediate gas 40 from the solid fuel conversion reactor 300. In further embodiments, the L-valve or loop seal as described hereinbefore can be replaced by other non-mechanical seals 600 such as a J-valve, a V-valve, an H-valve, or a seal pot. In some embodiments, the L-valve standpipe 344 has a smaller inner diameter (ID) than the gaseous fuel conversion reactor 100. In a further embodiment, the length of the L-valve standpipe 344 is at least longer than the bed height of the mixing chamber so that the L-valve operates properly with minimal aeration gas 650.

In some embodiments, unconvertible composition of the solid fuel 10 is promptly removed from the system 1000 to avoid disruption of movement of oxygen carrier solid 20 and solid fuel 10 as well as agglomeration. The unconvertible composition of the solid fuel 10 in the system 1000 is transported from the fuel pretreatment fluidized bed reactor 200 together with the rest of the solid fuel 10 into the solid fuel conversion reactor 300 wherein the unconvertible composition is converted to ash 60. In embodiments, the solid fuel conversion reactor 300 is configured to let the ash 60 be carried out by the intermediate gas 40 through the solid fuel conversion intermediate gas outlet of the solid fuel conversion reactor 300.

Figure 14:
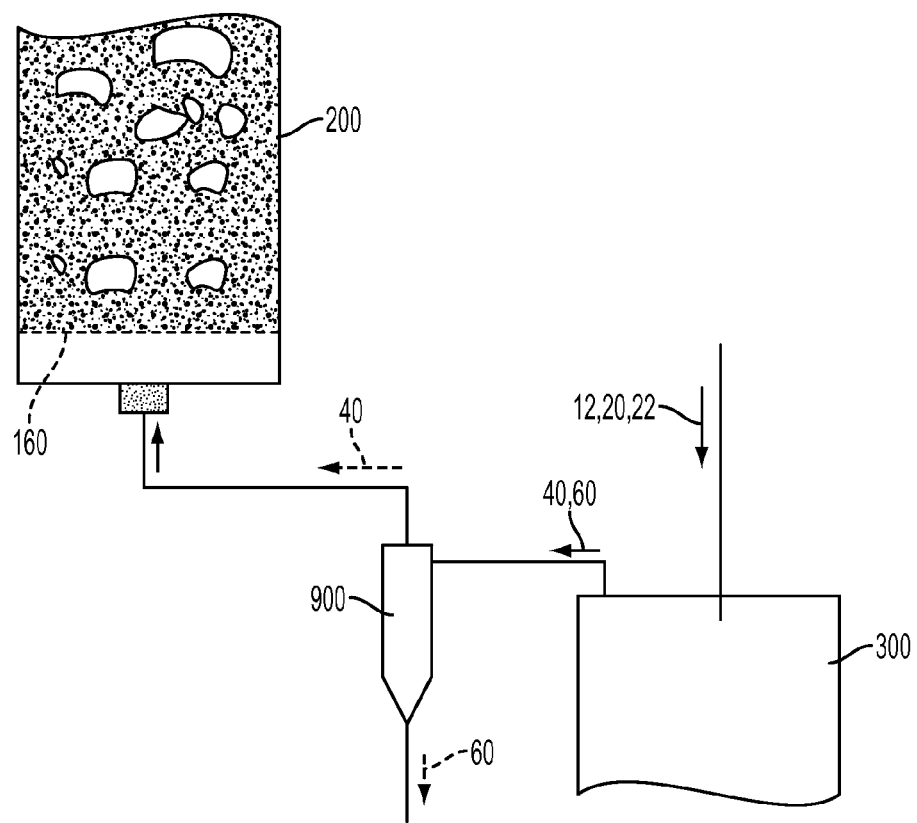
FIG. 14 is a schematic illustration of a section of a system for converting carbonaceous fuels, according to one or more embodiments described herein.

In embodiments wherein the fuel pretreatment fluidized bed reactor 200 comprises a meshed gas distributor 160, the ash 60 has to be separated from the intermediate gas 40 before being sent to the fuel pretreatment fluidized bed reactor 200. With reference to FIG. 14, an intermediate gas-solids separation unit 900, such as a cyclone, is installed between the solid fuel conversion reactor intermediate gas outlet 310 of the solid fuel conversion reactor 300 and the meshed gas distributor 160 of the fuel pretreatment fluidized bed reactor 200 to form an ash separator. In further embodiments, other non-mechanical intermediate gas-solids separation units 900 can also be used to separate ash 60 from intermediate gas 40.

Figure 15:
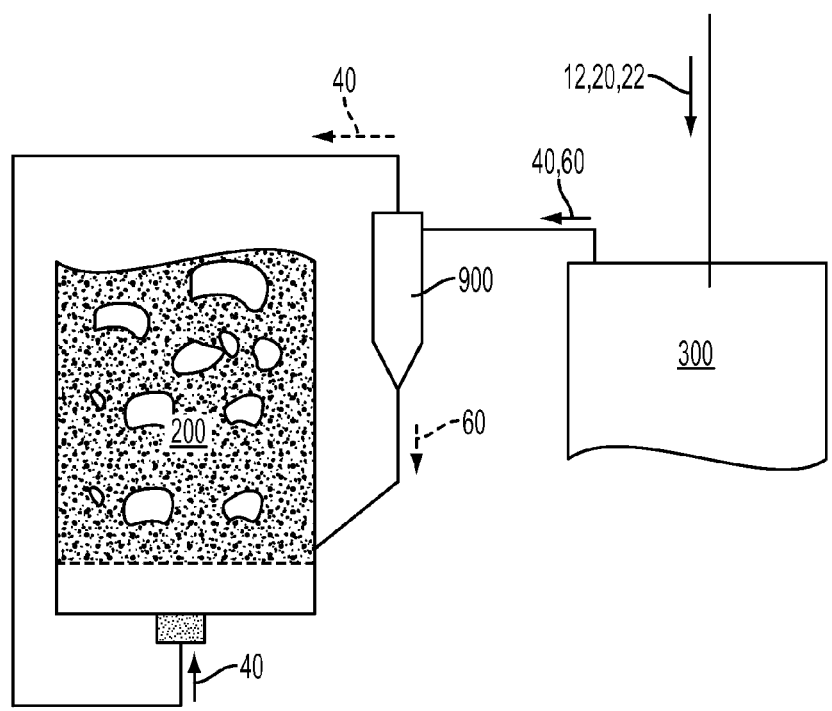
FIG. 15 is a schematic illustration of a section of a system for converting carbonaceous fuels, according to one or more embodiments described herein.

In still further embodiments, unconverted carbon together with ash 60 is entrained by intermediate gas 40 exiting the solid fuel conversion reactor 300 and separated from the intermediate gas 40 through the intermediate gas-solids separation unit 900. Referring to FIG. 15, the mixture of ash 60 and unconverted components of devotalitized solid fuel 12 from the solid fuel conversion reactor 300 is sent to the fuel pretreatment fluidized bed reactor 200. The intermediate gas 40 with entrained unconverted carbon and ash 60 is passed through the intermediate gas-solids separation unit 900 to separate the intermediate gas 40 from the ash 60 and unconverted carbon. The intermediate gas 40 is sent to the pretreatment reactor intermediate gas inlet 220 while the ash 60 and unconverted carbon are provided into the solids mixing zone 164 of the fuel pretreatment fluidized bed reactor 200.

Figure 16:
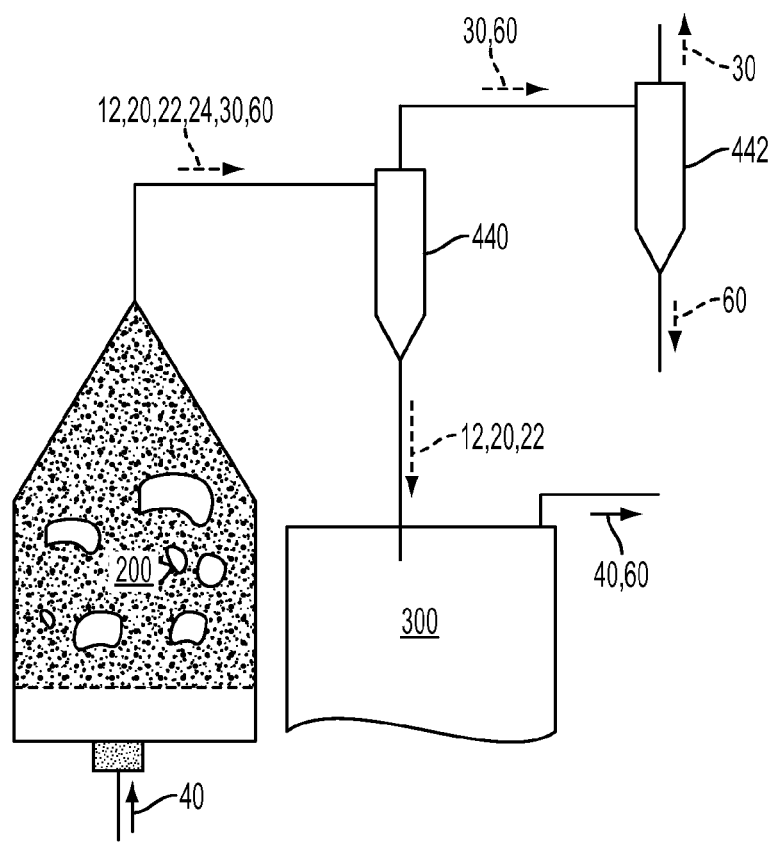
FIG. 16 is a schematic illustration of a section of a system for converting carbonaceous fuels, according to one or more embodiments described herein.

In further embodiments, a two stage gas-solids separation system is installed downstream of the fuel pretreatment fluidized bed reactor 200 to separate the exit stream from the fuel pretreatment fluidized bed reactor 200. For example, with reference to FIG. 16, the pretreatment gas-solids separation unit 400 comprises a primary separator 440 and a secondary separator 442. The primary separator 440 separates the off-gas 30 and ash 60 from the devotalitized solid fuel 12 and oxygen carrier solid 20. Further the secondary separator 442 separates the off-gas 30 and the ash 60. The two stage gas-solid separation system provides separated streams of off-gas 30, ash 60, and devotalitized solid fuel 12/oxygen carrier solid 20. In exemplary embodiments, the primary separator 440 and the secondary separator 442 are cyclones. In further embodiments, with reference to FIGS. 17A, 17B, and 17C, combinations of cyclones, overflow weirs, and disengagement pipes are used to create two stage gas-solids separation systems. For example, a disengagement pipe followed by a cyclone (FIG. 17A), an overflow weir followed by a cyclone (FIG. 17B), or two disengagement pipes (FIG. 17C).

In some embodiments, the two stage gas-solids separation system is installed between the solid fuel conversion reactor intermediate gas outlet 310 of the solid fuel conversion reactor 300 and the meshed gas distributor 160 of the fuel pretreatment fluidized bed reactor 200 to separate ash 60 from unconverted carbon. The unconverted carbon is then sent back to the fuel pretreatment fluidized bed reactor 200 while the ash 60 is discarded.

In yet another embodiment, wherein the fuel pretreatment fluidized bed reactor 200 is a fluidized bed with a substantially cone shaped bottom 240 and no meshed gas distributor 160, a gas-solids separation device may not be needed between the solid fuel conversion reactor intermediate gas outlet 310 of the solid fuel conversion reactor 300 and the pretreatment reactor intermediate gas inlet 220 of the fuel pretreatment fluidized bed reactor 200. Referring to FIGS. 17A to 17C, the ash 60 is removed, after passage through the fuel pretreatment fluidized bed reactor 200, using a two stage gas-solids separation system installed downstream of the fuel pretreatment fluidized bed reactor 200.

Figure 18:
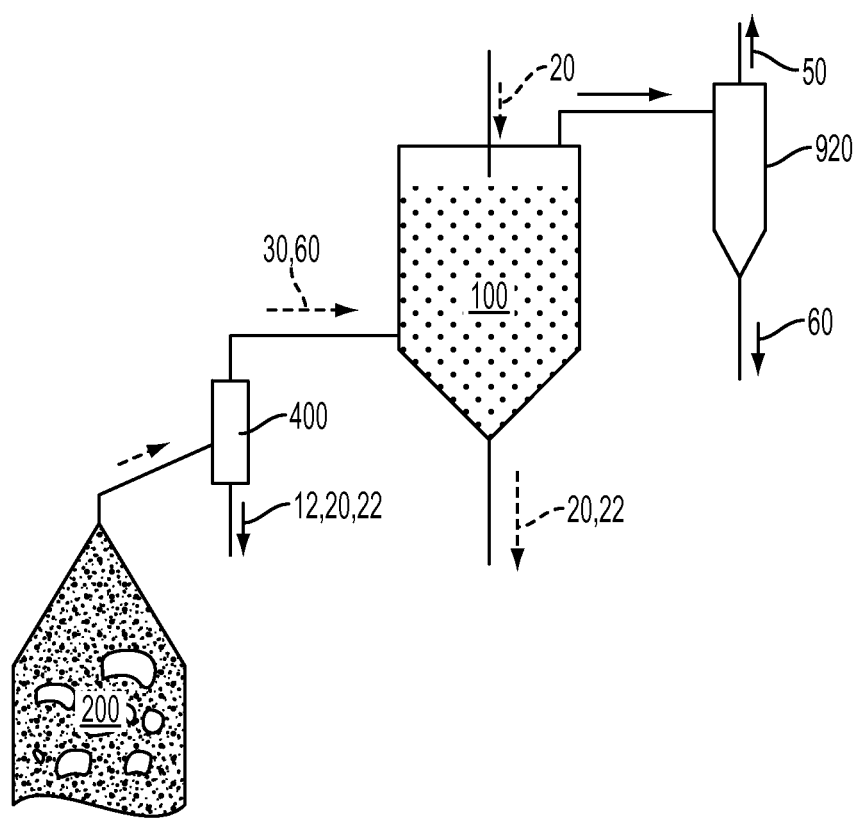
FIG. 18 is a schematic illustration of a section of a system for converting carbonaceous fuels, according to one or more embodiments described herein.

In yet another embodiment, with reference to FIG. 18, the ash 60 is removed downstream of the gaseous fuel conversion reactor 100. The pretreatment gas-solids separation unit 400 disposed at the outlet of the fuel pretreatment fluidized bed reactor 200 separates the mixture of devolatilized solid fuel 12 and oxygen carrier solid 20 from off-gas 30 and ash 60. In a further embodiment, the ash 60 is carried by the off-gas 30 to the gaseous fuel conversion reactor 100 so that any unconverted carbon inside the ash 60 may be further converted. The ash 60 then exits the gaseous fuel conversion reactor 100 with the product gas stream 50. A product gas-solids separation unit 920 is provided to separate the ash 60 from the product gas stream 50. In various embodiments, the pretreatment gas-solids separation unit 400 and/or product gas-solids separation unit 920 is a cyclone, a disengagement pipe, a filter, or a bag house.

Figure 19A:
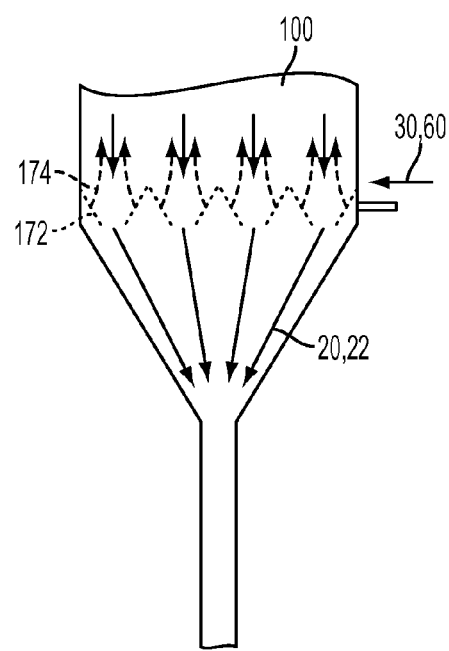
FIG. 19A is a schematic illustration of gas-solids injection into a moving bed reactor, according to one or more embodiments described herein.
Figure 19B:
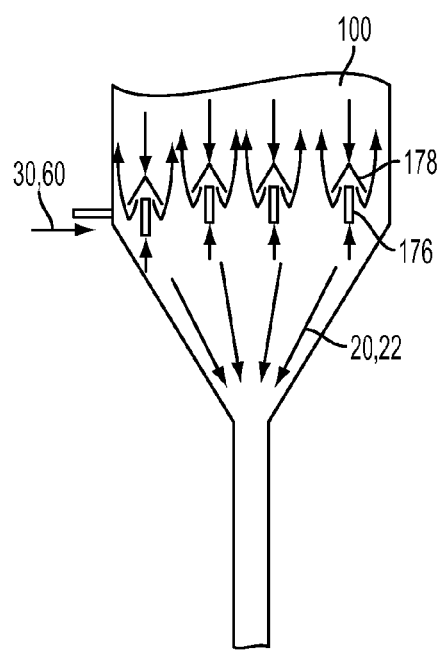
FIG. 19B is a schematic illustration of gas-solids injection into a moving bed reactor, according to one or more embodiments described herein.

In embodiments where ash 60 is carried with off-gas 30 of the fuel pretreatment fluidized bed reactor 200 to the gaseous fuel conversion reactor 100, conventional methods of injecting a gas stream into a moving-bed, such as a sparger ring, may not be applicable. Referring to FIGS. 19A and 19B, bubble caps 178 and/or porous internal walls 172 are used to distribute off-gas 30 containing ash 60 into the moving-bed gaseous fuel conversion reactor 100. In embodiments, off-gas 30 containing ash 60 enters the gaseous fuel conversion reactor 100 through bubble cap gas inlets 176. The bubble caps 178 are substantially cone or triangular prism shaped canopies and deflect solids flow in the gaseous fuel conversion reactor 100 to create a recessed space for off-gas insertion. In further embodiments, off-gas 30 containing ash 60 enters the gaseous fuel conversion reactor 100 through gas inlets 174. The porous internal walls 172 allow passage of gas and small solids but deflect bulk solids flow in the gaseous fuel conversion reactor 100.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

The invention claimed is:

1. A system for converting carbonaceous fuels comprising a gaseous fuel conversion reactor, a solid fuel conversion reactor, and a fuel pretreatment fluidized bed reactor disposed between the gaseous fuel conversion reactor and the solid fuel conversion reactor;

the gaseous fuel conversion reactor comprising:
 a gaseous fuel reactor oxygen carrier solid inlet,
 a gaseous fuel reactor off-gas inlet configured to receive off-gas from the fuel pretreatment fluidized bed reactor, and
 a gaseous fuel reactor oxygen carrier solid outlet,
 wherein the gaseous fuel conversion reactor is configured to convert the off-gas and oxygen carrier solids to a product gas stream comprising carbon dioxide and water, thereby reducing at least a portion of the oxygen carrier solids to reduced oxygen carrier solids;

the fuel pretreatment fluidized bed reactor comprising:
 a pretreatment reactor solid fuel inlet disposed in a fuel introduction section of the fuel pretreatment reactor,
 a pretreatment reactor oxygen carrier inlet configured to receive a mixture of oxygen carrier solids and reduced oxygen carrier solids from the gaseous fuel reactor oxygen carrier solid outlet,
 a pretreatment reactor intermediate gas inlet configured to receive intermediate gas from the solid fuel conversion reactor, the intermediate gas being used for fluidization, and
 a pretreatment reactor discharge in communication with the gaseous fuel conversion reactor off-gas inlet,
 wherein the fuel pretreatment fluidized bed reactor is configured to volatilize solid fuel using heat from the mixture of oxygen carrier solids and reduced oxygen carrier solids to produce a devolatilized solid fuel and off-gas, and subsequently discharge the off-gas, the devolatilized solid fuel, and the mixture of oxygen carrier solids and reduced oxygen carrier solids via the pretreatment reactor discharge;

the solid fuel conversion reactor comprising:
 a solid fuel conversion reactor inlet configured to receive the mixture of oxygen carrier solids and reduced oxygen carrier solids and devolatilized solid fuel from the pretreatment reactor discharge and
 a solid fuel conversion reactor intermediate gas outlet in communication with the pretreatment reactor intermediate gas inlet, and
 a solid fuel conversion reactor oxygen carrier solid outlet,
 wherein the solid fuel conversion reactor is configured to react the devolatilized solid fuel with the mixture of oxygen carrier solids and reduced oxygen carrier solids to produce the intermediate gas comprising carbon dioxide and water, thereby further reducing oxygen carrier solids to reduced oxygen carrier solids.

2. The system of claim 1, further comprising an oxidation reactor configured to react the reduced oxygen carrier solids from the solid fuel conversion reactor oxygen carrier solid outlet with an oxidation gas stream to convert the reduced oxygen carrier solid back to the oxygen carrier solid, the oxidation reactor comprising
 a reduced oxygen carrier solid inlet configured to receive the reduced oxygen carrier solid, and
 an oxidation reactor discharge configured to discharge the oxygen carrier solid and an oxygen depleted oxidation gas stream.

3. The system of claim 1, further comprising a pretreatment gas-solids separation unit in communication with the pretreatment reactor discharge and configured to separate the off-gas from the devolatilized solid fuel and the oxygen carrier solid exiting the fuel pretreatment fluidized bed reactor.

4. The system of claim 1, wherein the gaseous fuel conversion reactor is divided into two or more staged reactors in series.

5. The system of claim 1, wherein the solid fuel conversion reactor is divided into two or more staged reactors in series.

6. The system of claim 1, wherein the gas velocity of the off-gas through the gaseous fuel conversion reactor is less than the minimum fluidization velocity of the oxygen carrier solid.

7. The system of claim 1, further comprising a conversion enhancement gas inlet configured to introduce a conversion enhancement gas into the solid fuel conversion reactor to enhance conversion of the devolatilized solid fuel.

8. The system of claim 7, wherein the conversion enhancement gas is the product gas stream from the gaseous fuel conversion reactor.

9. The system of claim 7, wherein the gas velocity of the conversion enhancement gas through the solid fuel conversion reactor is less than the minimum fluidization velocity of the oxygen carrier solid.

10. The system of claim 2, further comprising an oxidizer gas-solids separation unit in communication with the oxidation reactor discharge and configured to separate the oxygen depleted oxidation gas stream from the oxygen carrier solid exiting the oxidation reactor.

11. The system of claim 2, further comprising a non-mechanical seal separating the solid fuel conversion reactor and the oxidation reactor, the non-mechanical seal configured to prevent gases generated in the solid fuel conversion reactor and the oxidation gas stream in the oxidation reactor from transferring between the solid fuel conversion reactor and the oxidation reactor while allowing the reduced oxygen carrier solid to pass through.

12. The system of claim 10, further comprising a non-mechanical seal separating the gaseous fuel conversion reactor and oxidizer gas-solids separation unit, the non-mechanical seal configured to prevent the product gas stream of the gaseous fuel conversion reactor and the oxygen depleted oxidation gas stream in the oxidizer gas-solids separation unit from transferring between the gaseous fuel conversion reactor and the oxidizer gas-solids separation unit or oxygen carrier solid storage vessel while allowing the oxygen carrier solid to pass through.

13. The system of claim 1, wherein the fuel pretreatment reactor further comprises a substantially cone shaped bottom in communication with a gas-solids jet configured to provide a uniform distribution of the intermediate gas and the oxygen carrier solid into the fuel pretreatment fluidized bed reactor;
wherein the gas-solids jet comprises the pretreatment reactor intermediate gas inlet and the pretreatment reactor oxygen carrier inlet.

14. The system of claim 1, wherein the fuel pretreatment reactor further comprises a supply chamber and a mixing chamber with a crossflow slit disposed between the supply chamber and the mixing chamber configured to allow passage of the oxygen carrier solid through the crossflow slit;
wherein an aeration inlet provides an aeration gas from the bottom or from the side of the supply chamber to propel the oxygen carrier solid through the crossflow slit into the mixing chamber.

15. The system of claim 1, wherein the fuel pretreatment reactor further comprises a gas introduction zone and a solids mixing zone separated by a meshed gas distributor configured to distribute the intermediate gas uniformly across the fuel pretreatment fluidized bed reactor.

16. The system of claim 15, further comprising an ash separator disposed between the solid fuel conversion intermediate gas outlet and the pretreatment reactor intermediate gas inlet and is configured to separate ash and/or unconverted carbon from the intermediate gas before the intermediate gas is provided to the fuel pretreatment fluidized bed reactor.

17. A system for converting carbonaceous fuels comprising a gaseous fuel conversion reactor, a solid fuel conversion reactor, a fuel pretreatment fluidized bed reactor disposed between the gaseous fuel conversion reactor and the solid fuel conversion reactor, an oxidation reactor disposed downstream of the solid fuel conversion reactor, and a pretreatment gas-solids separation unit;
the gaseous fuel conversion reactor comprising:
a gaseous fuel reactor oxygen carrier solid inlet,
a gaseous fuel reactor off-gas inlet configured to receive off-gas from the fuel pretreatment fluidized bed reactor, and
a gaseous fuel reactor oxygen carrier solid outlet,
wherein the gaseous fuel conversion reactor is configured to convert the off-gas and oxygen carrier solids to a product gas stream comprising carbon dioxide and water, thereby reducing at least a portion of the oxygen carrier solids to reduced oxygen carrier solids;
the fuel pretreatment fluidized bed reactor comprising
a pretreatment reactor solid fuel inlet disposed in a fuel introduction section of the fuel pretreatment reactor,
a pretreatment reactor oxygen carrier inlet configured to receive a mixture of oxygen carrier solids and reduced oxygen carrier solids from the gaseous fuel reactor oxygen carrier solid outlet,
a pretreatment reactor intermediate gas inlet configured to receive intermediate gas from the solid fuel conversion reactor, the intermediate gas being used for fluidization, and
a pretreatment reactor discharge in communication with the gaseous fuel conversion reactor off-gas inlet,
wherein the fuel pretreatment fluidized bed reactor is configured to volatilize solid fuel using heat from the mixture of oxygen carrier solids and reduced oxygen carrier solids to produce a devolatilized solid fuel and off-gas, and subsequently discharge the off-gas, the devolatilized solid fuel, and the mixture of oxygen carrier solids and reduced oxygen carrier solids via the pretreatment reactor discharge;
the solid fuel conversion reactor comprising:
a solid fuel conversion reactor inlet configured to receive the mixture of oxygen carrier solids and reduced oxygen carrier solids and devolatilized solid fuel from the pretreatment reactor discharge,
a solid fuel conversion reactor intermediate gas outlet in communication with the pretreatment reactor intermediate gas inlet, and
a solid fuel conversion reactor oxygen carrier solid outlet,
wherein the solid fuel conversion reactor is configured to react the devolatilized solid fuel with the mixture of oxygen carrier solids and reduced oxygen carrier solids to produce the intermediate gas comprising carbon dioxide and water, thereby further reducing oxygen carrier solids to reduced oxygen carrier solids;
the oxidation reactor comprising:
a reduced oxygen carrier solid inlet configured to receive the reduced oxygen carrier solid and
an oxidation reactor discharge configured to discharge the oxygen carrier solid and an oxygen depleted oxidation gas stream,
wherein the oxidation reactor is configured to react the reduced oxygen carrier solids from the solid fuel conversion reactor oxygen carrier solid outlet with an oxidation gas stream to convert the reduced oxygen carrier solid back to the oxygen carrier solid; and
wherein the pretreatment gas-solids separation unit is in communication with the pretreatment reactor discharge and configured to separate the off-gas from the devolatilized solid fuel and the oxygen carrier solid exiting the fuel pretreatment reactor.

18. The system of claim 17, further comprising an oxidizer gas-solids separation unit in communication with the oxidation reactor discharge and configured to separate the oxygen depleted oxidation gas stream from the oxygen carrier solid exiting the oxidation reactor.

19. The system of claim 17, wherein the fuel pretreatment reactor further comprises a supply chamber and a mixing chamber with a crossflow slit disposed between the supply chamber and the mixing chamber configured to allow passage of the oxygen carrier solid through the crossflow slit;
   wherein an aeration inlet provides an aeration gas from the bottom or from the side of the supply chamber to propel the oxygen carrier solid through the crossflow slit into the mixing chamber.

20. The system of claim 17, wherein the fuel pretreatment reactor further comprises a gas introduction zone and a solids mixing zone separated by a meshed gas distributor configured to distribute the intermediate gas uniformly across the fuel pretreatment fluidized bed reactor.

\* \* \* \* \*